United States Patent
Chung et al.

(10) Patent No.: US 10,887,495 B2
(45) Date of Patent: Jan. 5, 2021

(54) PHOTOGRAPHING APPARATUS MODULE, USER TERMINAL INCLUDING THE SAME, AND METHOD OF OPERATING THE USER TERMINAL

(71) Applicant: SAMSUNG ELECTRONICS CO., LTD., Suwon-si (KR)

(72) Inventors: Hae-in Chung, Anyang-si (KR); Jin-won Lee, Seongnam-si (KR); Chong-sam Chung, Hwaseong-si (KR); Jong-chul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/443,681

(22) Filed: Jun. 17, 2019

(65) Prior Publication Data
US 2019/0312995 A1   Oct. 10, 2019

Related U.S. Application Data

(62) Division of application No. 14/979,610, filed on Dec. 28, 2015, now Pat. No. 10,341,539.

(30) Foreign Application Priority Data

Aug. 4, 2015 (KR) .................. 10-2015-0110238

(51) Int. Cl.
*H04N 5/225* (2006.01)
*H04N 5/232* (2006.01)
*G03B 37/02* (2006.01)

(52) U.S. Cl.
CPC .......... *H04N 5/2252* (2013.01); *G03B 37/02* (2013.01); *H04N 5/2253* (2013.01);
(Continued)

(58) Field of Classification Search
CPC ................ H04N 5/2251–2254; H04N 5/2259
(Continued)

(56) References Cited

U.S. PATENT DOCUMENTS

| | | | | |
|---|---|---|---|---|
| 4,920,418 A | * | 4/1990 | Robinson | H04N 5/349 348/219.1 |
| 5,502,598 A | * | 3/1996 | Kimura | G02B 7/023 348/E5.028 |

(Continued)

FOREIGN PATENT DOCUMENTS

| | | |
|---|---|---|
| CN | 101785296 | 7/2010 |
| CN | 102035427 | 4/2011 |

(Continued)

OTHER PUBLICATIONS

Extended Search Report dated Jun. 1, 2018 in counterpart European Patent Application No. 15900491.0.

(Continued)

*Primary Examiner* — Anthony J Daniels
(74) *Attorney, Agent, or Firm* — Nixon & Vanderhye, P.C.

(57) ABSTRACT

An example photographing apparatus module includes: a photographing apparatus configured to rotate on a first axis and a second axis perpendicular to the first axis; and an actuator module configured to rotate the photographing apparatus on the first axis or the second axis. The actuator module includes: one or more first actuator devices configured to apply a contact force along an optical axis direction of the photographing apparatus that is perpendicular to the first axis and the second axis; and one or more second actuator devices configured to apply a driving force to the photographing apparatus along the first axis direction or the second axis direction.

15 Claims, 30 Drawing Sheets

(52) U.S. Cl.
CPC ......... *H04N 5/2254* (2013.01); *H04N 5/2257* (2013.01); *H04N 5/2259* (2013.01); *H04N 5/23216* (2013.01); *H04N 5/23296* (2013.01); *H04N 5/232935* (2018.08)

(58) Field of Classification Search
USPC .......................................... 348/207.99, 373
See application file for complete search history.

(56) References Cited

U.S. PATENT DOCUMENTS

| | | | |
|---|---|---|---|
| 5,946,127 A * | 8/1999 | Nagata | G01S 3/781 |
| | | | 310/328 |
| 6,078,440 A | 6/2000 | Ueyama | |
| 6,639,625 B1 * | 10/2003 | Ishida | H04N 1/0402 |
| | | | 348/218.1 |
| 6,727,954 B1 | 4/2004 | Okada | |
| 6,734,914 B1 * | 5/2004 | Nishimura | H04N 5/2251 |
| | | | 348/375 |
| 7,345,833 B2 | 3/2008 | Hwang | |
| 7,352,962 B2 * | 4/2008 | Lee | G03B 5/00 |
| | | | 348/211.7 |
| 7,664,388 B2 * | 2/2010 | Huang | G02B 7/023 |
| | | | 396/199 |
| 7,786,648 B2 | 8/2010 | Xu et al. | |
| 7,812,507 B2 | 10/2010 | Takahashi et al. | |
| 8,405,765 B2 * | 3/2013 | Lin | H04N 5/2257 |
| | | | 348/373 |
| 8,941,773 B2 | 1/2015 | Kamatani | |
| 2006/0279638 A1 | 12/2006 | Matsuda | |
| 2006/0285837 A1 | 12/2006 | Mashima et al. | |
| 2009/0052037 A1 | 2/2009 | Wernersson | |
| 2009/0153684 A1 | 6/2009 | Yoshida et al. | |
| 2009/0297137 A1 * | 12/2009 | Entis | G03B 17/02 |
| | | | 396/333 |
| 2010/0165184 A1 | 7/2010 | Park | |
| 2010/0304731 A1 * | 12/2010 | Bratton | H04N 5/232 |
| | | | 455/420 |
| 2011/0058099 A1 | 3/2011 | Lai | |
| 2011/0075280 A1 | 3/2011 | Chou et al. | |
| 2011/0228098 A1 * | 9/2011 | Lamb | G01S 17/023 |
| | | | 348/164 |
| 2012/0127319 A1 * | 5/2012 | Rao | H04N 5/23206 |
| | | | 348/169 |
| 2012/0182436 A1 | 7/2012 | Hu et al. | |
| 2014/0204244 A1 | 7/2014 | Choi et al. | |
| 2015/0005031 A1 | 1/2015 | Sheu | |
| 2015/0043076 A1 | 2/2015 | Nakayama | |
| 2015/0077852 A1 | 3/2015 | Lam | |
| 2015/0130894 A1 * | 5/2015 | Holzer | G06F 16/532 |
| | | | 348/36 |
| 2015/0181200 A1 | 6/2015 | Arrasvuori et al. | |
| 2015/0198781 A1 | 7/2015 | Kang | |
| 2016/0041375 A1 * | 2/2016 | Zhan | G02B 21/0008 |
| | | | 348/79 |

FOREIGN PATENT DOCUMENTS

| | | |
|---|---|---|
| CN | 102736211 | 10/2012 |
| CN | 104375356 | 2/2015 |
| JP | 11-018000 | 1/1999 |
| JP | 5376780 | 10/2013 |
| KR | 10-2014-0093557 | 7/2014 |
| KR | 10-2015-0084158 | 7/2015 |

OTHER PUBLICATIONS

Search Report and Written Opinion dated May 4, 2016 in counterpart International Patent Application No. PCT/KR2015/013956.
First Office Action dated Nov. 27, 2020 for Chinese Patent Application No. 201580081480.1 and English-language translation.

* cited by examiner

PHOTOGRAPHING APPARATUS MODULE, USER TERMINAL INCLUDING THE SAME, AND METHOD OF OPERATING THE USER TERMINAL

CROSS-REFERENCE TO RELATED APPLICATION

This application is a divisional of U.S. application Ser. No. 14/979,610, filed on Dec. 28, 2015, which is based on and claims priority under 35 U.S.C. § 119 to Korean Patent Application No. 10-2015-0110238, filed on Aug. 4, 2015, in the Korean Intellectual Property Office, the disclosure of which is incorporated herein in its entirety by reference.

BACKGROUND

1. Field

The present disclosure relates to a photographing apparatus module for capturing an image, a user terminal including the photographing apparatus module, and a method of operating the user terminal.

2. Description of the Related Art

Terminals may be classified into mobile (or portable) terminals and stationary terminals according to their mobility. As the functions of mobile terminals have become more diversified, the mobile terminals have been implemented in the form of multimedia devices with complex functions such as music or video file playback, gaming, and broadcast reception.

A mobile terminal may include a photographing apparatus module and a display unit for displaying an image. Unlike a general photographing apparatus, when a photographing apparatus is modularized and attached to a terminal, the photographing apparatus may not be freely rotated according to an attachment state of the photographing apparatus or a state (e.g., orientation) in which the terminal is held by a user and thus subject composition adjustment and viewing angle securement may be difficult.

Accordingly, it is desirable to provide a photographing apparatus module, which is improved so that a user may more conveniently use a photographing apparatus attached to a terminal, a user terminal including the photographing apparatus module, and a method of operating the user terminal.

SUMMARY

The present application describes by way of example and without limitation examples of a photographing apparatus module capable of rotating a photographing apparatus, a user terminal including the photographing apparatus module, and a method of operating the user terminal.

Additional aspects will be set forth in part in the description which follows and, in part, will be apparent from the description, or may be learned by practice of the presented example embodiments.

According to an aspect of an example embodiment, a photographing apparatus module includes: a photographing apparatus configured to rotate on a first axis and a second axis perpendicular to the first axis; and an actuator module configured to rotate the photographing apparatus on the first axis or the second axis, wherein the actuator module includes: one or more first actuator devices configured to apply a contact force along an optical axis direction of the photographing apparatus that is perpendicular to the first axis and the second axis; and one or more second actuator devices configured to apply a driving force to the photographing apparatus along the first axis direction or the second axis direction.

The photographing apparatus may include: a lens disposed at a front portion thereof; and a housing configured to accommodate the lens and having a hemispherical rear portion facing the front portion.

The first actuator device may be configured to extend along one of the first axis direction and the second axis direction and includes one end portion moveable in the optical axis direction to generate a contact force with respect to the photographing apparatus, and the second actuator device may be configured to extend along one of the first axis direction and the second axis direction and include one end portion moveable in the other of the first axis direction and the second axis direction to generate a driving force with respect to the photographing apparatus.

The first actuator device may include a first actuator configured to extend along the first axis direction and a second actuator configured to extend along the second axis direction, and the second actuator device may include a first actuator configured to extend along the second axis direction and a second actuator configured to extend along the first axis direction.

The first actuator of the first actuator device may include a pair of first piezoelectric devices configured to extend along the first axis direction, being stacked along the optical axis direction, and having one end portion supported. The second actuator of the first actuator device may include a pair of first piezoelectric devices configured to extend along the second axis direction, being stacked along the optical axis direction, and having one end portion supported. The first actuator of the second actuator device may include a pair of second piezoelectric devices configured to extend along the second axis direction, being stacked along the first axis direction, and having one end portion supported. The second actuator of the second actuator device may include a pair of second piezoelectric devices configured to extend along the first axis direction, being stacked along the second axis direction, and having one end portion supported.

When a voltage having a predetermined phase difference is applied to each of the pair of first piezoelectric devices and the pair of second piezoelectric devices, one of the pair of first piezoelectric devices may expand in a direction parallel to an extension direction thereof, the other of the pair of first piezoelectric devices may contract in a direction parallel to an extension direction thereof, one of the pair of second piezoelectric devices may expand in a direction parallel to an extension direction thereof, and the other of the pair of second piezoelectric devices may contract in a direction parallel to an extension direction thereof.

The photographing apparatus module may further include a contact portion disposed at the one end portion of the second actuator device, wherein the contact portion may contact the rear portion of the housing when the driving force is applied to the photographing apparatus.

The photographing apparatus module may further include one or more support members configured to support one end portion of the first actuator device and to apply a pressure to the first and second actuator devices along the optical axis direction.

The support member may include an elastic member.

Multiple first and second actuator devices may be formed, and the multiple first and second actuators may be disposed symmetrically with respect to a center of the rear portion of the housing.

The first actuator device may be configured to extend along the optical axis direction and to be strained in the optical axis direction to generate a contact force with respect to the photographing apparatus, and the second actuator device may be configured to extend along one of the first axis direction and the second axis direction and have one end portion moveable in the other of the first axis direction and the second axis direction to generate a driving force with respect to the photographing apparatus.

The first actuator device may include a first actuator and a second actuator configured to extend along the optical axis direction, and the second actuator device may include a first actuator configured to extend along the second axis direction and a second actuator configured to extend along the first axis direction.

The first actuator and the second actuator of the first actuator device may include a first piezoelectric device configured to extend along the optical axis direction, be stacked along the optical axis direction, and have one end portion supported. The first actuator of the second actuator device may include a pair of second piezoelectric devices configured to extend along the second axis direction, be stacked along the first axis direction, and have one end portion supported. The second actuator of the second actuator device may include a second piezoelectric device configured to extend along the first axis direction, be stacked along the second axis direction, and have one end portion supported.

When a voltage having a predetermined phase is applied to the first piezoelectric device and a voltage having a predetermined phase difference is applied to the pair of second piezoelectric devices, the first piezoelectric device may expand or contract in the optical axis direction, one of the pair of second piezoelectric devices may expand in a direction parallel to an extension direction thereof, and the other of the pair of second piezoelectric devices may contract in a direction parallel to an extension direction thereof.

The photographing apparatus module may further include a contact portion disposed at the one end portion of the second actuator device, wherein the contact portion may contact the rear portion of the housing when the driving force is applied to the photographing apparatus.

The photographing apparatus module may further include one or more support members configured to support one end portion of the first actuator device and apply pressure to the first and second actuator devices along the optical axis direction.

The support member may include an elastic member.

The first actuator device may be configured to extend in the first and second axis directions and have a center portion moveable in the optical axis direction to generate a contact force with respect to the photographing apparatus, and the second actuator device may be configured to extend along one of the first axis direction and the second axis direction and have a center portion moveable in the other of the first axis direction and the second axis direction to generate a driving force with respect to the photographing apparatus.

The second actuator device may include a first actuator configured to extend along the second axis direction and a second actuator configured to extend along the first axis direction.

The first actuator device may include a pair of cross-shaped first piezoelectric devices configured to extend along the first axis direction and the second axis direction and being stacked along the optical axis direction. The first actuator of the second actuator device may include a pair of second piezoelectric devices configured to extend along the first axis direction and being stacked along the second axis direction. The second actuator of the second actuator device may include a pair of second piezoelectric devices configured to extend along the second axis direction and being stacked along the first axis direction.

The pair of second piezoelectric devices included in the first and second actuators of the second actuator device may be disposed between the pair of first piezoelectric devices included in the first actuator device.

When a voltage having a predetermined phase difference is applied to each of the pair of first piezoelectric devices and the pairs of second piezoelectric devices, one of the pair of first piezoelectric devices may expand in a direction parallel to an extension direction thereof, the other of the pair of first piezoelectric devices may contract in a direction parallel to an extension direction thereof, one of the pair of second piezoelectric devices may expand in a direction parallel to an extension direction thereof, and the other of the pair of second piezoelectric devices may contract in a direction parallel to an extension direction thereof.

The photographing apparatus module may further include a contact portion disposed at the center portion of the first actuator device, wherein the contact portion may contact the rear portion of the housing when the driving force is applied to the photographing apparatus.

The photographing apparatus module may further include a support member configured to support the first and second actuator devices and to apply pressure to the first and second actuator devices along the optical axis direction.

The support member may include an elastic member.

The photographing apparatus module may further include: a first casing configured to accommodate the photographing apparatus and the actuator module; and a second casing configured to accommodate the first casing, wherein the photographing apparatus is rotatable on one of the first axis and the second axis with respect to the first casing and the first casing is rotatable on the other of the first axis and the second axis with respect to the second casing.

According to an aspect of another example embodiment, a user terminal includes the photographing apparatus module.

The user terminal may further include a controller configured to generate a control signal for rotating the photographing apparatus, wherein the photographing apparatus may include an image sensor configured to acquire an image signal.

The controller may be configured to generate a first image based on the image signal, recognize a particular object in the first image, and rotate the photographing apparatus based on the particular object.

The control unit may be configured to rotate the photographing apparatus based on the particular object when the particular object moves.

The control unit may be configured to acquire still images during the rotation of the photographing apparatus and generate a synthesized image by synthesizing the still images based on the particular object.

The user terminal may further include an input/output device configured to receive an input signal input from an outside thereof, wherein the controller may be configured to rotate the photographing apparatus according to the input signal.

The control unit may be configured to generate a preview image based on the image signal and rotate the photographing apparatus according to a control signal input through the input/output device by using the preview image.

The input/output device may include a touch panel configured to receive a touch input, and a rotation direction and a rotation degree of the photographing apparatus may be determined according to a direction and a movement distance of the touch input.

The rotation degree of the photographing apparatus may be proportional to the movement distance of the touch input.

The input/output device may include short-range wireless communication circuitry.

According to an aspect of another example embodiment, a method of operating the user terminal includes: generating a first image by using an image signal acquired through an image sensor; recognizing a particular object by performing image recognition on the first image; and rotating the photographing apparatus based on the particular object.

The method may further include generating a synthesized image by synthesizing still images, which are acquired from the rotating photographing apparatus, based on the particular object.

According to an aspect of another example embodiment, a method of operating the user terminal includes: generating a preview image by using an image signal acquired through an image sensor; receiving a control signal generated by using the preview image; and rotating the photographing apparatus according to the control signal.

The receiving of the control signal may be receiving a touch input to a touch panel, and in the rotating of the photographing apparatus, a rotation direction and a rotation degree of the photographing apparatus may be determined according to a direction and a movement distance of the touch input.

The rotation degree of the photographing apparatus may be proportional to the movement distance of the touch input.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
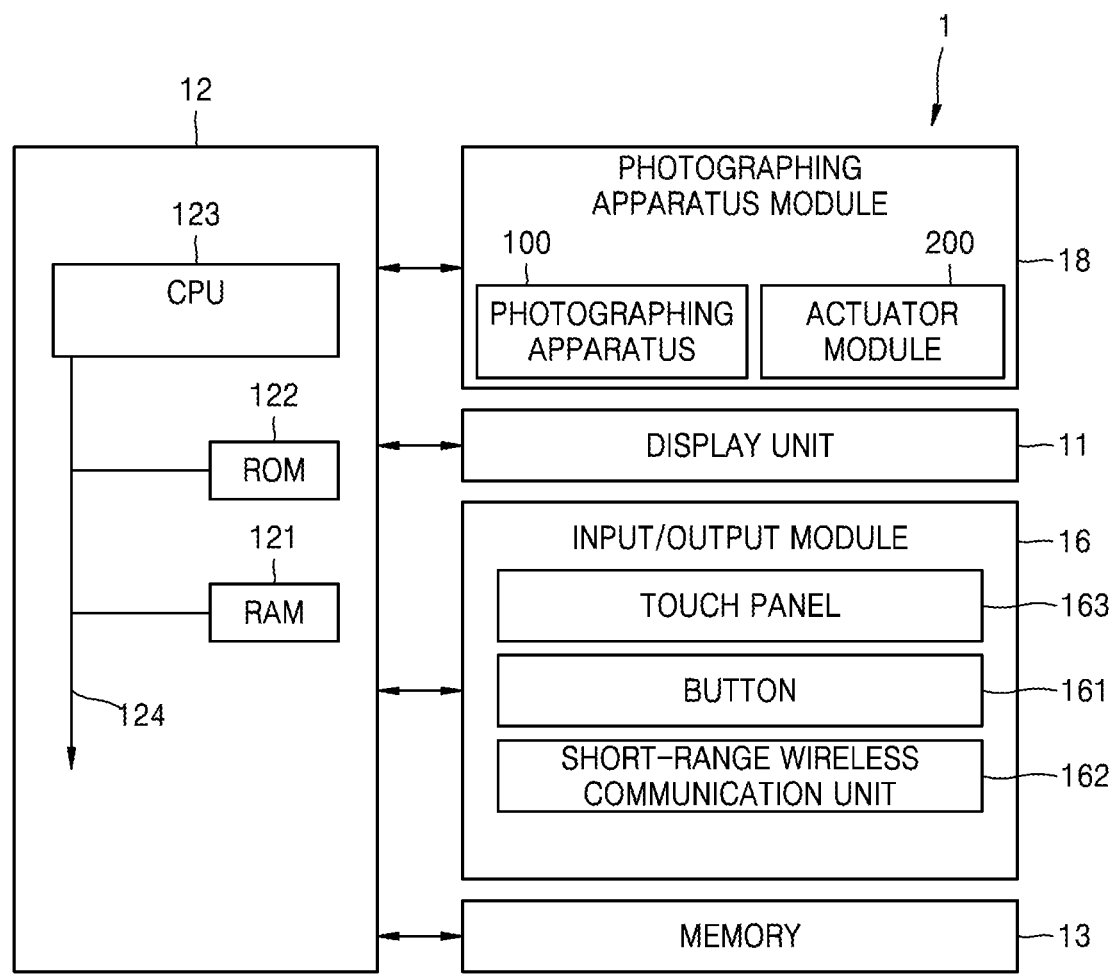
FIG. 1 is a block diagram illustrating a configuration of a user terminal according to an example embodiment.

Reference will now be made in detail to example embodiments which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the disclosed concepts. As used herein, the term "and/or" includes any and all combinations of one or more of the associated listed items. Expressions such as "at least one of,"

when preceding a list of elements, modify the entire list of elements and do not modify the individual elements of the list.

The following detailed descriptions according to the present disclosure will provide example embodiments. Also, terms of elements defined for convenience of description may be used herein. However, the terms used for convenience of description are not intended to limit the scope of rights according to the present disclosure and may be applied to similar systems or to simple modifications of systems having similar technical backgrounds.

Likewise, in the accompanying drawings, some components may be exaggerated, omitted, or schematically illustrated, and the size of each component may not completely reflect an actual size thereof. The scope of the present disclosure is not limited by the relative sizes or intervals illustrated in the accompanying drawings.

As used herein, the singular forms "a", "an", and "the" are intended to include the plural forms as well, unless the context clearly indicates otherwise.

As used herein, the terms "units" and "modules" may refer to units that perform at least one function or operation, and the units may be implemented as hardware or software or a combination of hardware and software.

As used herein, the term "touch" or "touch input" may include not only the case of direct contact, but also the case in which a user terminal senses the body or body part of a user that approaches the user terminal or is present near the user terminal (e.g., within a predetermined distance (e.g., 2 cm) therefrom).

The disclosed concepts will be described below in detail with reference to the accompanying drawings.

Figure 2:
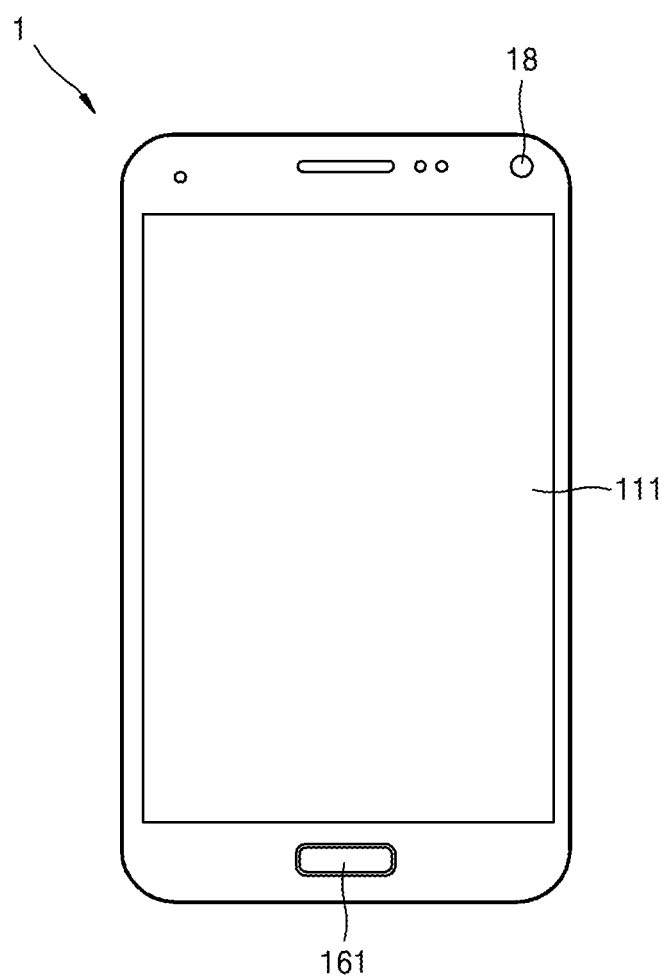
FIG. 2 is a front view of a user terminal according to an example embodiment.

FIG. 1 is a block diagram illustrating a configuration of a user terminal according to an example embodiment. FIG. 2 is a front view of a user terminal according to an example embodiment. Examples of a user terminal 1 described herein may include, but are not limited to, smart phones, mobile phones, portable phones, tablet personal computers (PCs), PCs, smart televisions (TVs), personal data assistants (PDAs), laptop computers, media players, MP3 players, micro servers, global positioning system (GPS) apparatuses, e-book terminals, digital broadcast terminals, kiosks, electronic picture frames, navigation apparatuses, digital TVs, wearable devices such as head-mounted displays (HMDs) or wrist watches, and other mobile or non-mobile computing apparatuses.

Referring to FIGS. 1 and 2, the user terminal 1 according to an example embodiment may include a display unit 11, a control unit 12, a memory 13, an input/output module 16, and a photographing apparatus module 18.

The display unit 11 may include a display panel 111 (or multiple display panels) and control circuitry (e.g., a controller) (not illustrated) for controlling the display panel 111. The display panel 111 may include various types of displays such as liquid crystal displays (LCDs), organic light-emitting diode (OLED) displays, active-matrix organic light-emitting diode (AM-OLED) displays, and plasma display panels (PDPs).

The control unit 12 may control the operations of components included in the user terminal 1. For example, the control unit 12 may include a random-access memory (RAM) 121, a read-only memory (ROM) 122, a central processing unit (CPU) 123, a bus 124, and other circuitry (not shown). The RAM 121, the ROM 122, and the CPU 123 may be connected to each other through the bus 124. In general, the control unit may include hardware, software and firmware for performing the various operations described herein. For example, the control unit may include circuitry such as a CPU, an application specific integrated circuit, a floating point gate array and/or dedicated circuitry.

The CPU 123 may access the memory 13 and perform booting by using an operating system (OS) stored in the memory 13. Also, the CPU 123 may perform various operations by using various programs, contents, and data stored in the memory 13.

The ROM 122 may store an instruction set for system booting. For example, when the user terminal 1 is turned on in response to a turn-on command, the CPU 123 may copy the OS stored in the memory 13 into the RAM 121 according to the instruction set stored in the ROM 122 and execute the OS to boot the system. When the booting is completed, the CPU 123 may copy various programs stored in the memory 13 into the RAM 121 and execute the programs copied into the RAM 121, to perform various operations.

The memory 13 may store various programs and data used for the operations of the user terminal 1. For example, the memory 13 may include at least one of an internal memory (not illustrated) and an external memory (not illustrated).

The internal memory may include, for example, at least one of volatile memories (e.g., dynamic RAMs (DRAMs), static RAMs (SRAMs), and synchronous dynamic RAMs (SDRAMs)), nonvolatile memories (e.g., one-time programmable ROMs (OTPROMs), programmable ROMs (PROMs), erasable and programmable ROMs (EPROMs), electrically erasable and programmable ROMs (EEPROMs), mask ROMs, and flash ROMs), hard disk drives (HDDs), and solid state drives (SSDs). According to an example embodiment, the control unit 12 may load data or commands received from at least one of the nonvolatile memories or other components into the volatile memories and process the same. Also, the control unit 12 may store data received or generated from other components in the nonvolatile memories.

The external memory may include, for example, at least one of CF (Compact Flash), SD (Secure Digital), Micro-SD (Micro Secure Digital), Mini-SD (Mini Secure Digital), xD (extreme Digital), and Memory Stick.

The input/output module or device 16 may receive an input signal input from an outside thereof and transmit an output signal to the outside thereof, and may include at least one of one or more buttons 161 and a touch panel 163.

The button 161 may be formed at the front, side, or rear of a housing of the user terminal 1, and may include at least one of a power/lock button (not illustrated), a volume button (not illustrated), a menu button, a home button, a back button, and a search button.

The touch panel 163 may be provided in the form of a touchscreen (not illustrated) in combination with the display panel 111 of the display unit 11. For example, the touchscreen (not illustrated) may include an integrated module in which the display panel 111 and the touch panel 163 are combined into a laminated structure.

The photographing apparatus module 18 may capture a still image or a moving image. The photographing apparatus module 18 may include at least one photographing apparatus 100 (e.g., image sensor, camera) for capturing a still image or a moving image and an actuator module 200 for driving the photographing apparatus 100. Also, the photographing apparatus module 18 may include an auxiliary light source (not illustrated) for providing a light amount necessary for photographing.

Multiple photographing apparatus modules 18 may be provided, e.g., one of the photographing apparatus modules 18 may be disposed at the front of the user terminal 1, and one or more other photographing apparatus modules 18 may be disposed at the rear of the user terminal 1. Also, the photographing apparatus modules 18 may be disposed adjacently to each other (e.g., at intervals greater than 1 cm and smaller than 8 cm) to capture a three-dimensional (3D) still image or a 3D moving image. The configuration of the photographing apparatus module 18 will be described below in detail with reference to FIGS. 3 to 5.

Figure 3:
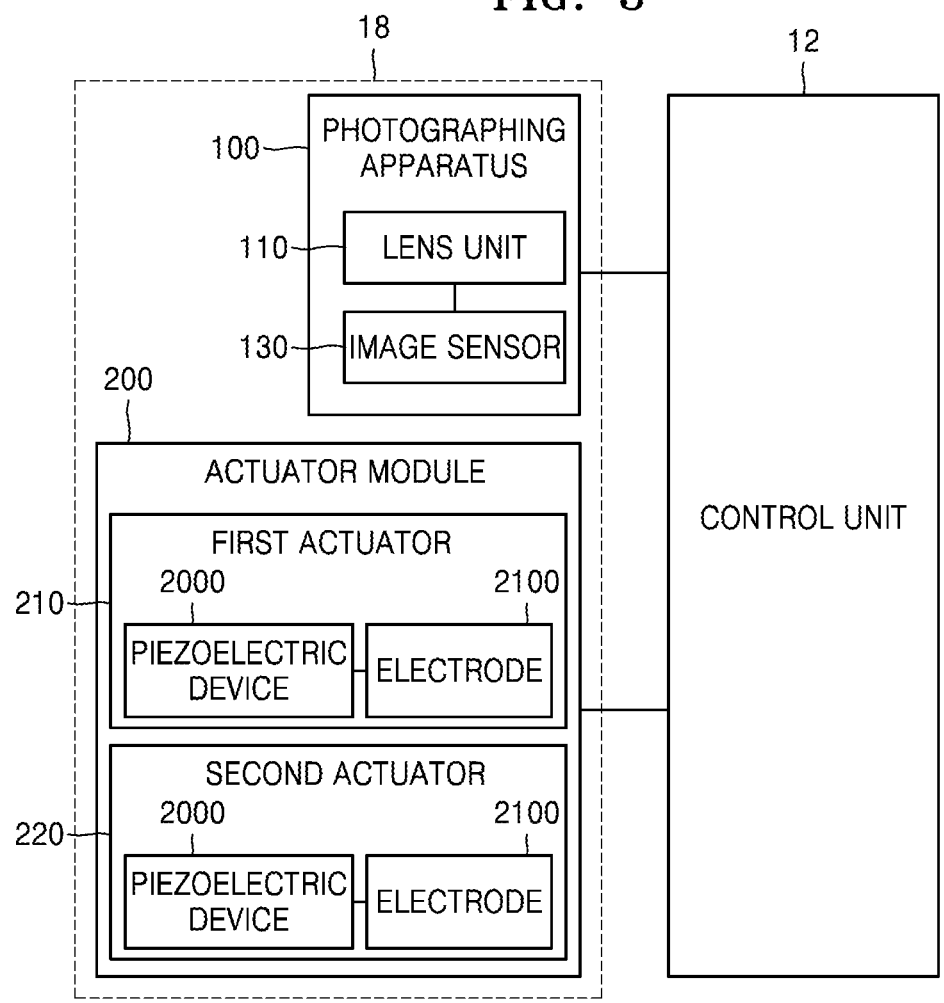
FIG. 3 is a block diagram illustrating a configuration of a photographing apparatus module according to an example embodiment.
Figure 4:
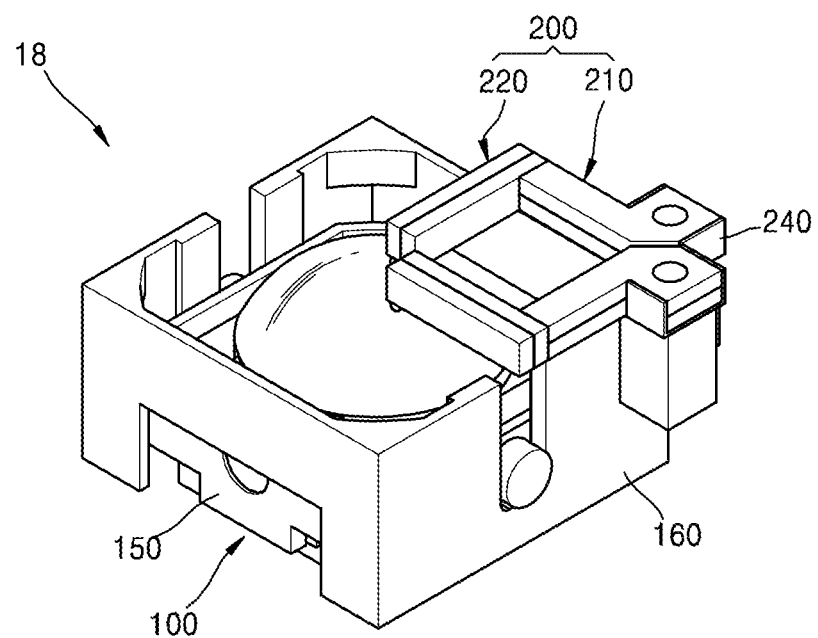
FIG. 4 is a perspective view of a photographing apparatus module according to an example embodiment.
Figure 5:
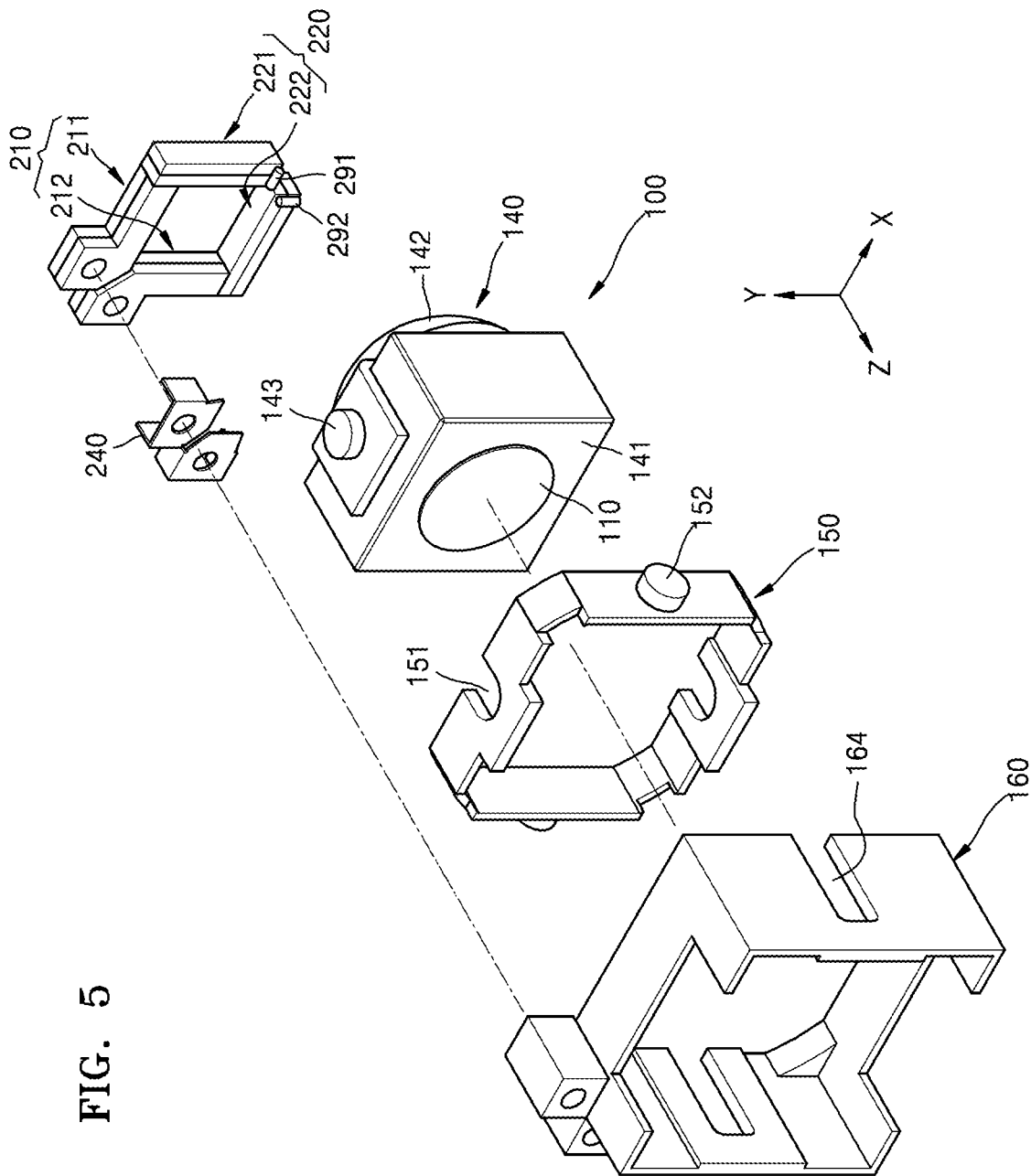
FIG. 5 is an exploded perspective view of a photographing apparatus module according to an example embodiment.

FIG. 3 is a block diagram illustrating a configuration of a photographing apparatus module according to an example embodiment. FIG. 4 is a perspective view of a photographing apparatus module according to an example embodiment. FIG. 5 is an exploded perspective view of a photographing apparatus module according to an example embodiment.

Referring to FIG. 3, the photographing apparatus module 18 according to an example embodiment may include a photographing apparatus 100 for capturing a still image or a moving image and an actuator module 200 including multiple actuator devices for driving and rotating the photographing apparatus 100 on multiple axes.

The photographing apparatus 100 may include an image sensor 130 and a lens unit 110 for focusing an image light on an image surface of the image sensor 130. The lens unit 110 may include one or more lenses. The lenses may include a zoom lens for zooming in on a subject image and a focus lens for adjusting a subject focus. The lenses may be driven by a zoom motor (not illustrated) or an auto-focusing (AF) motor (not illustrated) to change their relative positions. A lens driving structure and an optical structure for focus adjustment and a lens driving structure and an optical structure for zoom adjustment may include various structures that are known in the related art. The control unit 12 may control the positions of the lenses for zoom factor adjustment and focus adjustment.

The image sensor 130 may receive image light and convert the image light into an electrical signal. The image sensor 130 may include a photoelectric conversion device such as a complementary metal-oxide semiconductor (CMOS) or a charge-coupled device (CCD), and may convert image light input through the lens unit 110 into an electrical signal. The electrical signal generated by the image sensor 130 may be converted into image data by the control unit 12.

For example, the control unit 12 may convert the electrical signal of the image sensor 130 into RGB data and then convert the RGB data into raw data such as YUV signals including a chrominance signal and a luminance signal. The conversion process by the control unit 12 may include, for example, an operation of reducing a driving noise of the image sensor 130, which is included in the electrical signal, by using a correlated double sampling (CDS) circuit, an operation of adjusting a signal gain after noise reduction by an automatic gain control (AGC) circuit, an operation of converting an analog signal into a digital signal by using an analog-to-digital (A/D) converter, and detailed operations for digital signal processing such as pixel defect correction, gain correction, white balance correction, and gamma correction.

The actuator module 200 may generate a driving force for rotating the photographing apparatus 100. For example, the actuator module 200 may include first and second actuator devices 210 and 220 for outputting a generating force or a displacement by using electricity as input energy. The first and second actuator devices 210 and 220 may include: piezoelectric devices 2000 configured to generate an electric field when a mechanical strain is applied thereto and generate a mechanical strain when an electric field is applied thereto; and electrodes 2100 connected respectively to the piezoelectric devices 2000.

The piezoelectric devices 2000 included in the first and second actuator devices 210 and 220 may, for example, be formed to have a linear shape and be disposed in a stacked configuration, and a contact body contacting the piezoelectric devices 2000 may be moved in one direction by the mechanical strain of the piezoelectric devices 2000. The photographing apparatus 100 may be rotated by diversifying the disposition directions of the piezoelectric devices 2000. Accordingly, the actuator module 200 may perform a first rotation operation and a second rotation operation of the photographing apparatus 100 separately or simultaneously based on a control signal received from the control unit 12. The disposition of the piezoelectric devices 2000 and the first rotation operation and the second rotation operation of the photographing apparatus 100 will be described later in detail with reference to FIGS. 7 to 12.

Referring to FIGS. 3, 4 and 5, the photographing apparatus 100 according to an example embodiment may include a lens unit 110, an image sensor 130, and a housing unit 140 for accommodating the lens unit 110 and the image sensor 130. The photographing apparatus 100 may be accommodated in a first case unit or casing 150, and the photographing apparatus 100 and the first case unit 150 may be accommodated in a second case unit or casing 160. The actuator module 200 according to an example embodiment may include a first actuator device 210, a second actuator device 220, and a pressing unit or support member 240.

The housing unit 140 may accommodate the lens unit 110 and the image sensor 130. In the housing unit 140, the lens unit 110 may be disposed at a front portion 141 facing a subject, and a rear portion 142 facing the front portion 141 may be formed to have a hemispherical shape. The housing unit 140 may be supported by the first case unit 150 to rotate on a second axis Y perpendicular to an optical axis Z of the lens unit 110 with respect to the first case unit 150. For this purpose, a first rotation axis (or projection) 143 extending along the second axis (Y) direction may be disposed at both side portions of the housing unit 140.

The first case unit 150 may accommodate the housing unit 140. Since the first case unit 150 has a first through hole 151 formed at a top portion and a bottom portion thereof to insert the first rotation axis 143 thereinto, the housing unit 140 may rotate on the second axis Y with respect to the first case unit 150 as described above. Also, the first case unit 150 and the photographing apparatus 100 accommodated in the first case unit 150 may be supported by the second case unit 160 to rotate on a first axis X perpendicular to the second axis Y and the optical axis Z of the lens unit 110 with respect to the second case unit 160. For this purpose, a second rotation axis or projection 152 extending along the first axis (X) direction may be disposed at both side portions of the first case unit 150.

The second case unit 160 may be configured to accommodate the first case unit 150, and may be configured to fix the photographing apparatus 100 to the user terminal 1. For example, the second case unit 160 may have a second through hole 164 formed at both side portions thereof to insert the second rotation axis 152 thereinto. Accordingly, the first case unit 150 and the photographing apparatus 100 accommodated in the first case unit 150 may rotate on the first axis X with respect to the second case unit 160.

The first and second actuator devices 210 and 220 may be strained in one direction to generate a contact force with respect to the photographing apparatus 100 and a driving force with respect to the photographing apparatus 100. For example, the first and second actuator devices 210 and 220 may include a pair of actuators 211, 221 for rotating the photographing apparatus 100 on the second axis Y and a pair of actuators 212, 222 for rotating the photographing apparatus 100 on the first axis X. First/second contact units or portions 291/292 protruding in the optical axis (Z) direction may be formed at one end portion of the actuators 221/222. The first/second contact units 291/292 may be disposed to contact a portion of the photographing apparatus 100, for example, the rear portion 142 of the housing unit 140, to transmit a driving force generated by the second actuator device 220 to the photographing apparatus 100.

The pressing unit 240 may support the first and second actuator devices 210 and 220 so that the first and second actuator devices 210 and 220 may face the photographing apparatus 100. As an example, since the pressing unit 240 is disposed to be fixed to one end portion of the first actuator device 210 and to the second case unit 160, the pressing unit 240 may apply a pressure to the first and second actuator devices 210 and 220 along the optical axis (Z) direction so that the first and second actuator devices 210 and 220 may be disposed to face a portion of the photographing apparatus 100, for example, the rear portion 142 of the housing unit 140. The pressing unit 240 may include an elastic member to adjust a pressing force with respect to the first and second actuator devices 210 and 220. The structure of the actuator module 200 will be described below in greater detail.

Figure 6A:
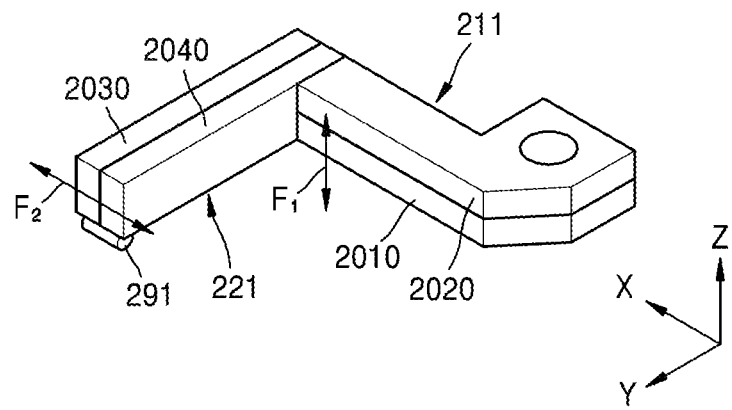
FIG. 6A is a perspective view of an actuator module according to an example embodiment.
Figure 6B:
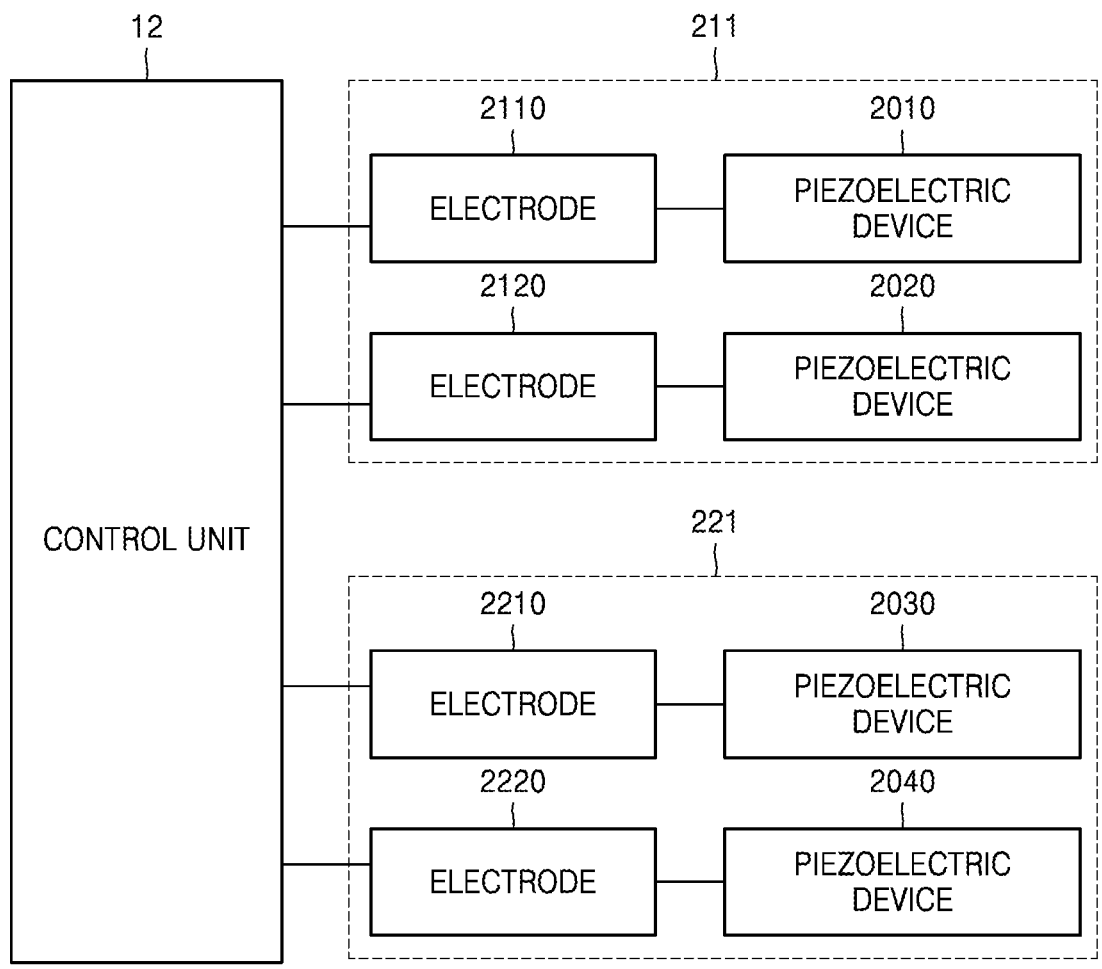
FIG. 6B is a block diagram of an actuator module according to an example embodiment.
Figure 6C:
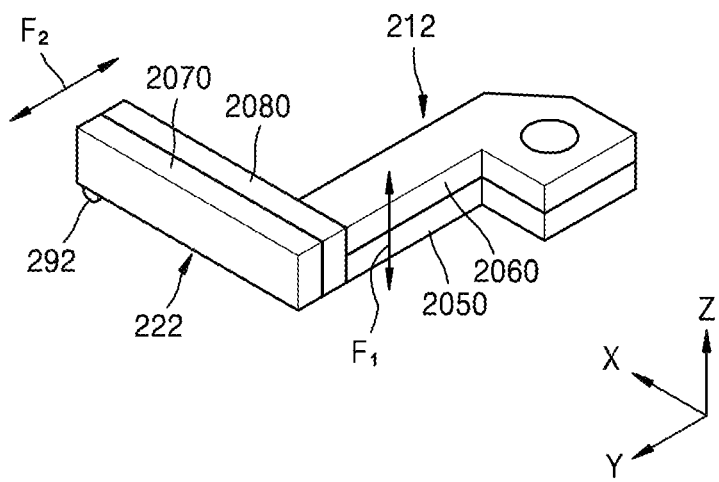
FIG. 6C is a perspective view of an actuator module according to an example embodiment.
Figure 6D:
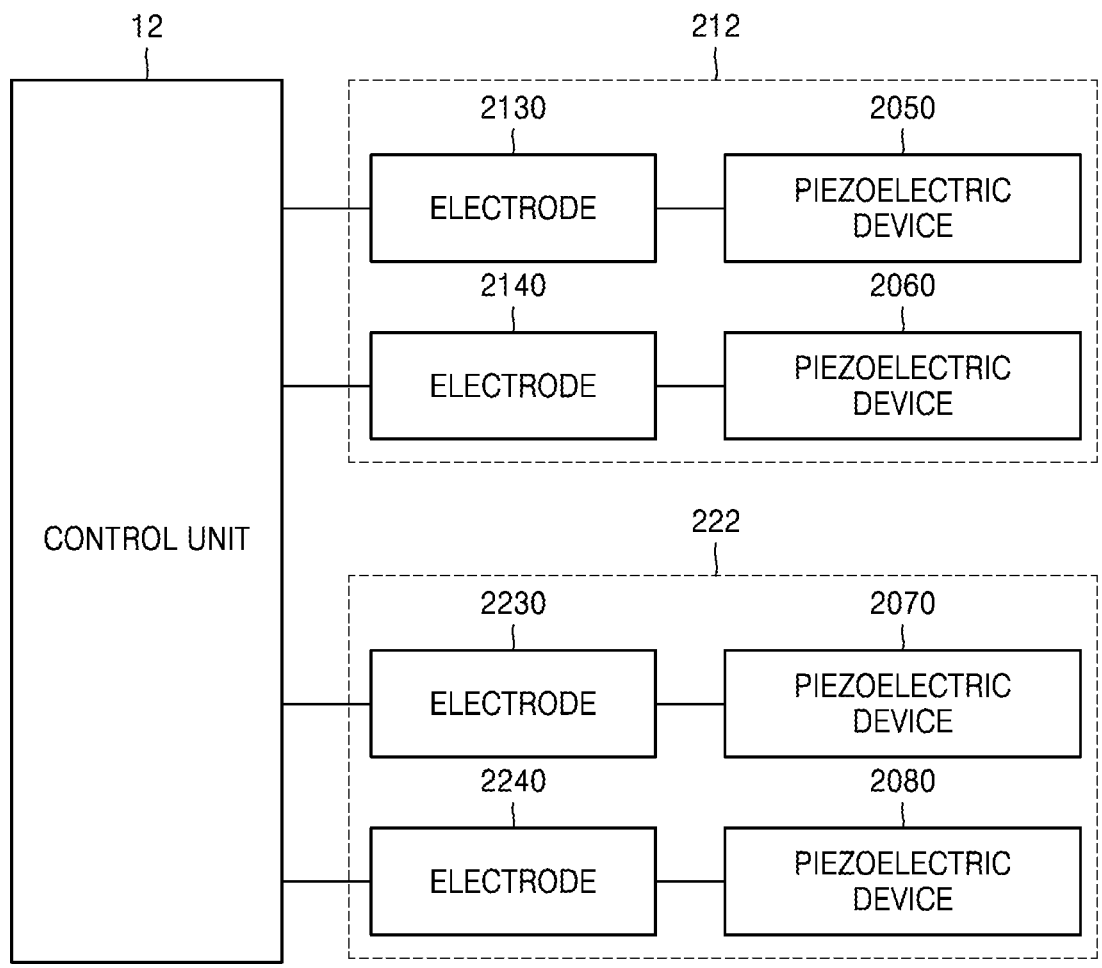
FIG. 6D is a block diagram of an actuator module according to an example embodiment.

FIG. 6A is a perspective view of an actuator module according to an example embodiment. FIG. 6B is a block diagram of an actuator module according to an example embodiment. FIG. 6C is a perspective view of an actuator module according to an example embodiment. FIG. 6D is a block diagram of an actuator module according to an example embodiment.

The first and second actuator devices 210 and 220 according to an example embodiment may include a plurality of piezoelectric devices 2000, and each piezoelectric device 2000 according to an example embodiment may include a piezoelectric structure extending in one direction. For example, each piezoelectric device 2000 may include a multilayer piezoelectric structure including thin layers including at least one selected from lead zirconate titanate (PZT), barium titanate ($BaTiO_3$), barium strontium titanate (($Ba, Sr$) ($TiO_3$)), lead magnesium niobate (PMN), lead titanate (PT), solid solution thereof, and relaxor ferroelectric. For example, each piezoelectric device 2000 according to an example embodiment may include, but is not limited to, a first type of piezoelectric device D31 in which a piezoelectric material stack direction and a strain direction of the piezoelectric device 2000 are perpendicular to each other.

For example, the first actuator device 210 may include a first actuator 211 formed to extend in the first axis (X) direction and a second actuator 212 formed to extend in the second axis (Y) direction, and the second actuator device 220 may include a first actuator 221 formed to extend in the second axis (Y) direction and a second actuator 222 formed to extend in the first axis (X) direction. Referring to FIGS. 6A and 6B, the actuator 211 may include piezoelectric devices 2010 and 2020 formed to extend in the first axis (X) direction and stacked along the optical axis (Z) direction. One end portion of the piezoelectric devices 2010 and 2020 may be supported by the pressing unit 240 as illustrated in FIG. 5, and electrodes 2110 and 2120 may be connected respectively to the piezoelectric devices 2010 and 2020 to form an electric field having a predetermined phase difference. The piezoelectric devices 2010 and 2020 may expand or contract along the first direction (X) perpendicular to the optical axis (Z) direction. Accordingly, the actuator 211, that is, one end portion of the piezoelectric devices 2010 and 2020 may bend in a clockwise or counterclockwise direction around the second axis Y. Thus, one end portion of the piezoelectric devices 2010 and 2020 may be moved along the optical axis (Z) direction to generate a contact force at the first contact unit 291 with respect to the photographing apparatus 100.

The actuator 221 may include piezoelectric devices 2030 and 2040 formed to extend in the second axis (Y) direction and stacked along the first axis (X) direction. One end portion of the piezoelectric devices 2030 and 2040 may be supported by one end portion of the piezoelectric devices 2010 and 2020, and electrodes 2210 and 2220 may be connected respectively to the piezoelectric devices 2030 and 2040 to form an electric field having a predetermined phase difference. The piezoelectric devices 2030 and 2040 may expand or contract along the second direction (Y) perpendicular to the first axis (X) direction. Accordingly, the actuator 221, that is, one end portion of the piezoelectric devices 2030 and 2040, may bend in a clockwise or counterclockwise direction around the optical axis Z. Thus, one end portion of the piezoelectric devices 2030 and 2040 may be moved in the first axis direction to generate a driving force with respect to the photographing apparatus 100.

Referring to FIGS. 6C and 6D, the actuator 212 may include piezoelectric devices 2050 and 2060 formed to extend in the second axis (Y) direction and stacked along the optical axis (Z) direction. One end portion of the piezoelectric devices 2050 and 2060 may be supported by the pressing unit 240 as illustrated in FIG. 5, and electrodes 2130 and 2140 may be connected respectively to the piezoelectric devices 2050 and 2060 to form an electric field having a predetermined phase difference. The piezoelectric devices 2050 and 2060 may expand or contract along the second direction (Y) perpendicular to the optical axis (Z) direction. Accordingly, the actuator 212, that is, one end portion of the piezoelectric devices 2050 and 2060, may bend in a clockwise or counterclockwise direction around the first axis X. Thus, one end portion of the piezoelectric devices 2050 and 2060 may be moved along the optical axis (Z) direction to generate a contact force at the second contact unit 292 with respect to the photographing apparatus 100.

The actuator 222 may include piezoelectric devices 2070 and 2080 formed to extend in the first axis (X) direction and stacked along the second axis (Y) direction. One end portion of the piezoelectric devices 2070 and 2080 may be supported by one end portion of the piezoelectric devices 2050 and 2060, and electrodes 2230 and 2240 may be connected respectively to the piezoelectric devices 2070 and 2080 to form an electric field having a predetermined phase difference. The piezoelectric devices 2070 and 2080 may expand or contract along the first direction (X) perpendicular to the second axis (Y) direction. Accordingly, the actuator 222, that is, the other end portion of the piezoelectric devices 2070 and 2080, may bend in a clockwise or counterclockwise direction around the optical axis Z. Thus, one end portion of the piezoelectric devices 2070 and 2080 may be moved in the second axis direction to generate a driving force with respect to the photographing apparatus 100.

As described above, the actuators 211 and 221 and the actuators 212 and 222 may be strained, and the contact force and the driving force generated by the actuators 211 and 221 and the actuators 212 and 222 may be transmitted through the first and second contact units 291 and 292 to the photographing apparatus 100 to rotate the photographing apparatus 100. Hereinafter, a process of rotating the photographing apparatus 100 by the actuator 211 and the actuator 221 according to the strain of the first actuator device 210 and the second actuator device 220 will be described in detail.

Figure 7:
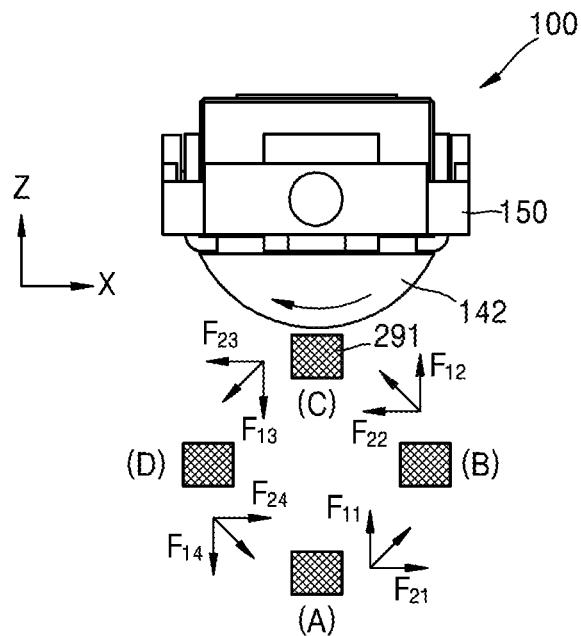
FIG. 7 is a plan view of a photographing apparatus module according to an example embodiment.
Figure 8A:
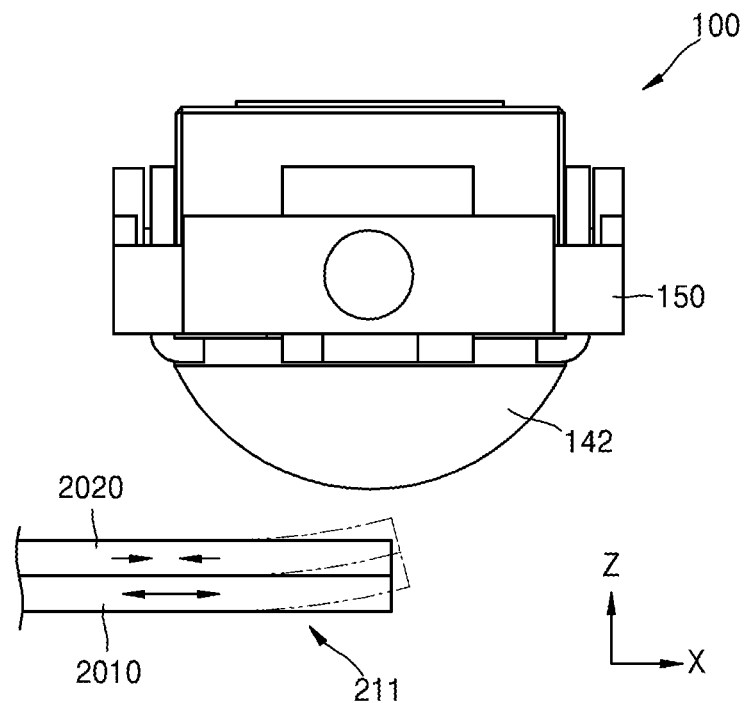
FIG. 8A is a plan view of a photographing apparatus module according to an example embodiment.
Figure 8B:
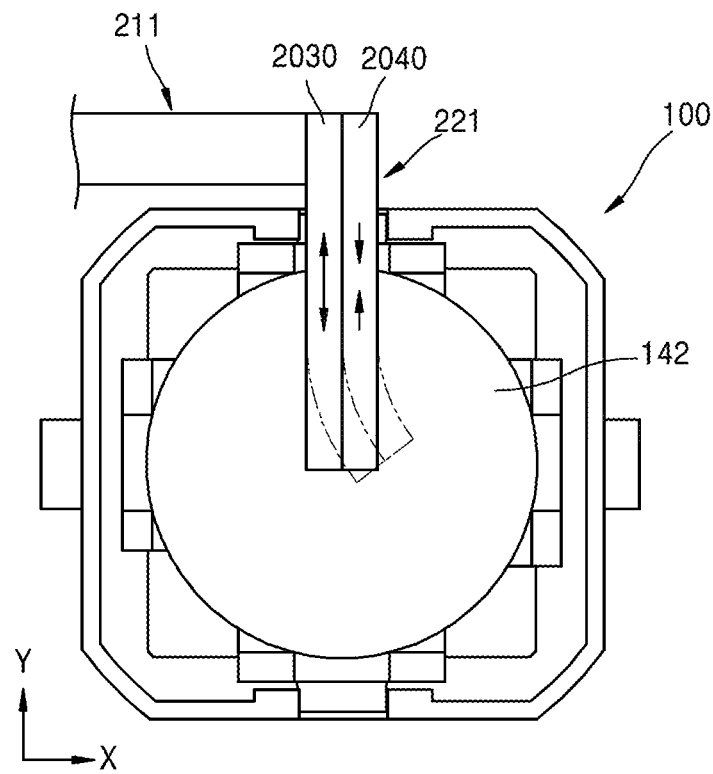
FIG. 8B is a front view of the photographing apparatus module of FIG. 8A.
Figure 9A:
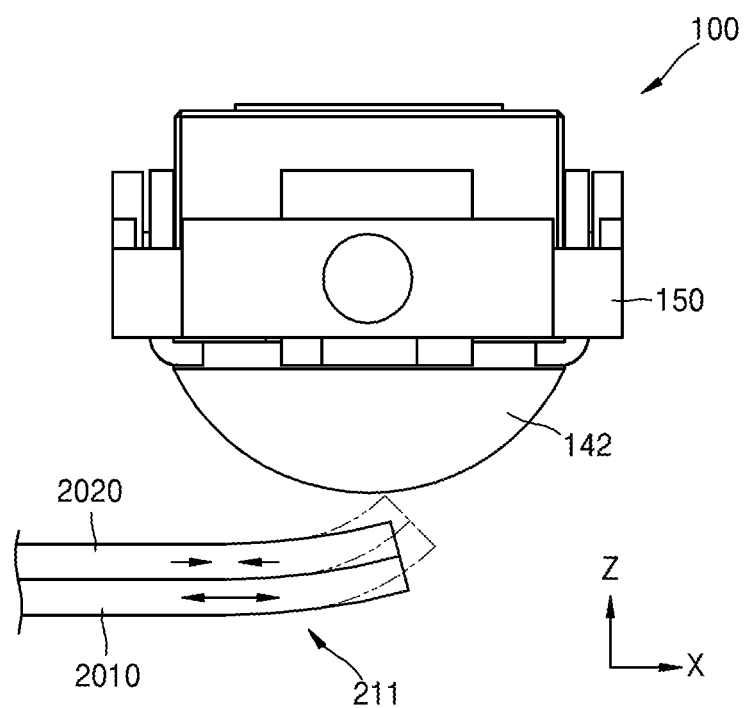
FIG. 9A is a plan view of a photographing apparatus module according to an example embodiment.
Figure 9B:
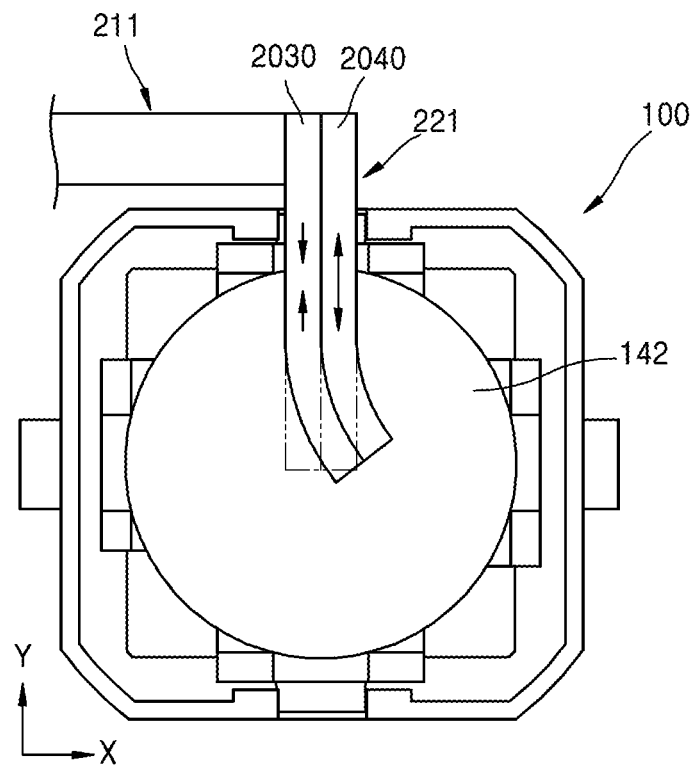
FIG. 9B is a front view of the photographing apparatus module of FIG. 9A.
Figure 10A:
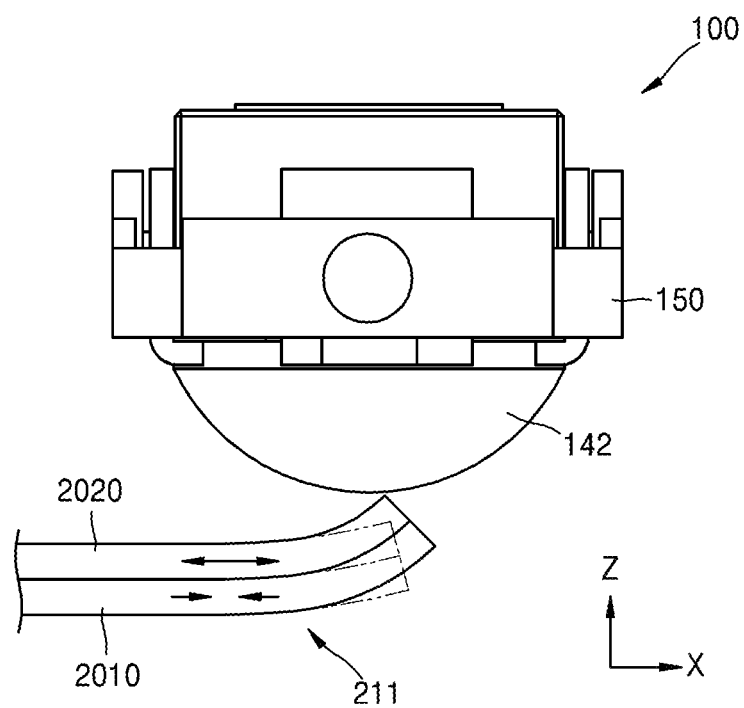
FIG. 10A is a plan view of a photographing apparatus module according to an example embodiment.
Figure 10B:
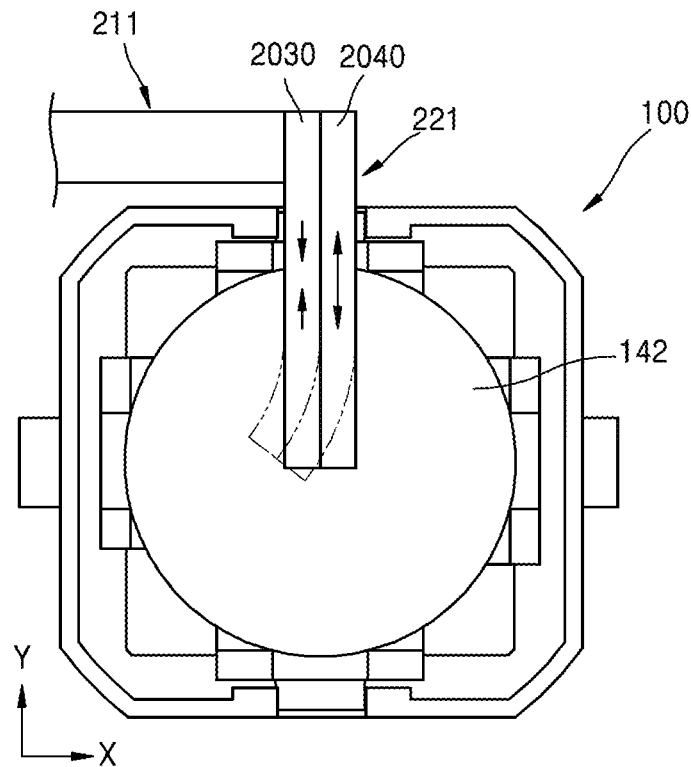
FIG. 10B is a front view of the photographing apparatus module of FIG. 10A.
Figure 11A:
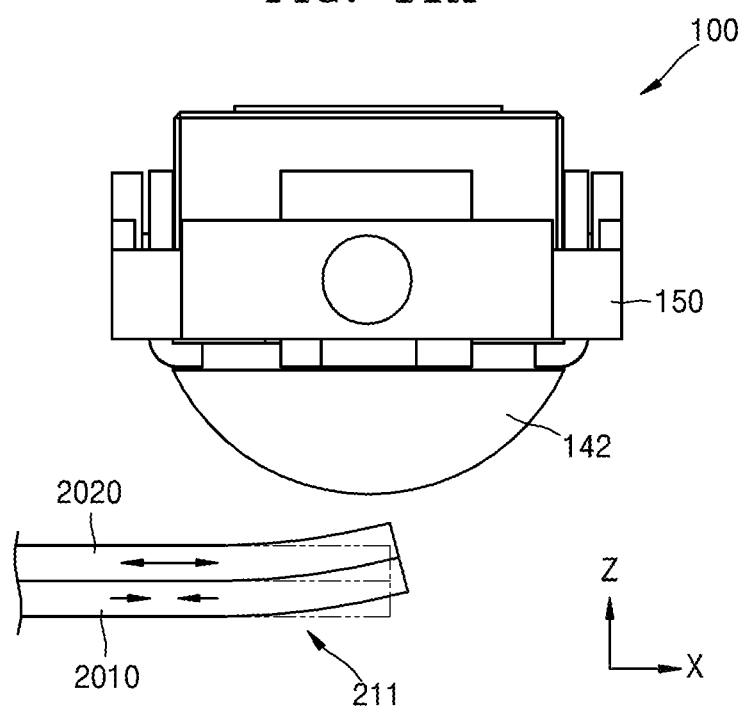
FIG. 11A is a plan view of a photographing apparatus module according to an example embodiment.
Figure 11B:
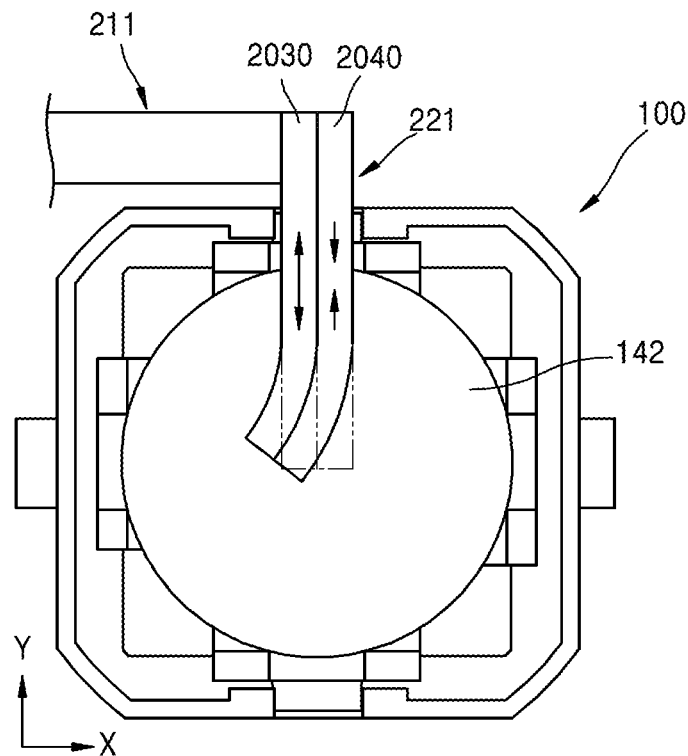
FIG. 11B is a front view of the photographing apparatus module of FIG. 11A.
Figure 12:
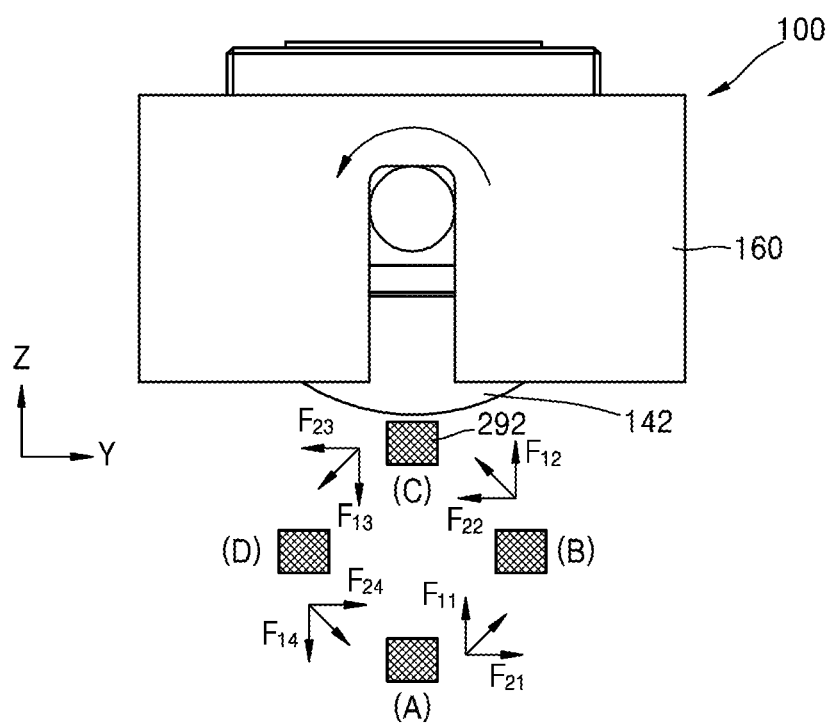
FIG. 12 is a plan view of a photographing apparatus module according to an example embodiment.

FIG. 7 is a plan view of a photographing apparatus module according to an example embodiment. FIG. 8A is a plan view of a photographing apparatus module according to an example embodiment. FIG. 8B is a front view of the photographing apparatus module of FIG. 8A. FIG. 9A is a plan view of a photographing apparatus module according to an example embodiment. FIG. 9B is a front view of the photographing apparatus module of FIG. 9A. FIG. 10A is a plan view of a photographing apparatus module according to an example embodiment. FIG. 10B is a front view of the photographing apparatus module of FIG. 10A. FIG. 11A is a plan view of a photographing apparatus module according to an example embodiment. FIG. 11B is a front view of the photographing apparatus module of FIG. 11A. FIG. 12 is a plan view of a photographing apparatus module according to an example embodiment.

Referring to FIGS. 7, 8A, and 8B, in order for the first contact unit 291 to move from a first position A to a second position B, the actuator 211, that is, one end portion of the piezoelectric devices 2010 and 2020 bends in the counterclockwise direction around the second axis Y, and the actuator 221, that is, one end portion of the piezoelectric devices 2030 and 2040 bends in the counterclockwise direction around the optical axis Z.

As an example, in order to bend one end portion of the piezoelectric devices 2010 and 2020 in the counterclockwise direction around the second axis Y, for example, when an electric field having a predetermined phase difference is applied to the piezoelectric devices 2010 and 2020 as illustrated in FIG. 6A, the piezoelectric device 2010 may expand along the first axis (X) direction and the piezoelectric device 2020 may contract along the first axis (X) direction, so that one end portion of the actuator 211 that is not supported by the pressing unit 240 may bend in the counterclockwise direction around the second axis Y.

When an electric field having a predetermined phase difference is applied to the piezoelectric devices 2030 and 2040, the piezoelectric device 2030 may expand along the second axis (Y) direction and the piezoelectric device 2040 may contract along the second axis (Y) direction, so that one end portion of the actuator 221 that is not supported by the piezoelectric devices 2010 and 2020 may bend in the counterclockwise direction around the optical axis Z.

As described above, since one end portion of the actuator 211 bends in the counterclockwise direction around the second axis Y and one end portion of the actuator 221 bends in the counterclockwise direction around the optical axis Z, one end portion of the actuator 211 may move in the optical axis (Z) direction and one end portion of the actuator 221 may move in the first axis (X) direction. Therefore, the first contact unit 291 formed at one end portion of the actuator 221 may receive a contact force $F_{11}$ in the optical axis (Z) direction applied from the actuator 211 and may receive a driving force $F_{21}$ in the first axis (X) direction applied from the actuator 221. Accordingly, the first contact unit 291 may move from the first position A to the second position B.

Referring to FIGS. 7, 9A, and 9B, in order for the first contact unit 291 to move from the second position B to a third position C, the actuator 211, that is, one end portion of the piezoelectric devices 2010 and 2020 bends in the counterclockwise direction around the second axis Y, and the actuator 221, that is, one end portion of the piezoelectric devices 2030 and 2040 bends in the clockwise direction around the optical axis Z.

In order to bend one end portion of the piezoelectric devices 2010 and 2020 in the counterclockwise direction on the second axis Y, for example, when an electric field having a predetermined phase difference is applied to the piezoelectric devices 2010 and 2020, the piezoelectric device 2010 may expand along the first axis (X) direction and the piezoelectric device 2020 may contract along the first axis (X) direction, so that one end portion of the actuator 211 that is not supported by the pressing unit 240 may bend in the counterclockwise direction around the second axis Y.

When an electric field having a predetermined phase difference is applied to the piezoelectric devices 2030 and 2040, the piezoelectric device 2030 may contract along the second axis (Y) direction and the piezoelectric device 2040 may expand along the second axis (Y) direction, so that one end portion of the actuator 221 that is not supported by the piezoelectric devices 2010 and 2020 may bend in the clockwise direction around the optical axis Z.

As described above, since one end portion of the actuator 211 bends in the counterclockwise direction around the second axis Y and one end portion of the actuator 221 bends in the clockwise direction around the optical axis Z, one end portion of the actuator 211 may move in the optical axis (Z) direction and one end portion of the actuator 221 may move in the first axis (X) direction. Therefore, the first contact unit 291 formed at the other end portion of the actuator 221 may receive a contact force $F_{12}$ in the optical axis (Z) direction applied from the actuator 211 and may receive a driving force $F_{22}$ in the first axis (X) direction applied from the actuator 221. Accordingly, the first contact unit 291 may move from the second position B to the third position C, and accordingly, the first contact unit 291 and the rear portion 142 of the housing unit 140 may contact and support each other.

Referring to FIGS. 7, 10A, and 10B, in order for the first contact unit 291 to move from the third position C to a fourth position D, the actuator 211, that is, one end portion of the piezoelectric devices 2010 and 2020 bends in the clockwise direction around the second axis Y, and the actuator 221, that is, one end portion of the piezoelectric devices 2030 and 2040 bends in the clockwise direction around the optical axis Z.

In order to bend one end portion of the piezoelectric devices 2010 and 2020 in the clockwise direction around the second axis Y, for example, when an electric field having a predetermined phase difference is applied to the piezoelectric devices 2010 and 2020, the piezoelectric device 2010 may contract along the first axis (X) direction and the piezoelectric device 2020 may expand along the first axis (X) direction, so that the other end portion of the actuator 211 that is not supported by the pressing unit 240 may bend in the clockwise direction around the second axis Y.

When an electric field having a predetermined phase difference is applied to the piezoelectric devices 2030 and 2040, the piezoelectric device 2030 may contract along the second axis (Y) direction and the piezoelectric device 2040 may expand along the second axis (Y) direction, so that one end portion of the actuator 221 that is not supported by the piezoelectric devices 2010 and 2020 may bend in the clockwise direction around the optical axis Z.

As described above, since one end portion of the actuator 211 bends in the counterclockwise direction around the second axis Y and one end portion of the actuator 221 bends in the clockwise direction around the optical axis Z, one end portion of the actuator 211 may move in the optical axis (Z) direction and one end portion of the actuator 221 may move in the first axis (X) direction. Therefore, the first contact unit 291 formed at one end portion of the actuator 221 may receive a contact force $F_{13}$ in the optical axis (Z) direction applied from the actuator 211 and may receive a driving force $F_{23}$ in the first axis (X) direction applied from the actuator 221. Accordingly, the first contact unit 291 may move from the third position C to the fourth position D. As described above, at the third position C, the first contact unit 291 and the rear portion 142 of the housing unit 140 may contact and support each other. When the first contact unit 291 moves from the third position C to the fourth position D, the first contact unit 291 may apply the driving force $F_{23}$ of the first axis (X) direction to the rear portion 142 of the housing unit 140. Accordingly, the photographing apparatus 100 may rotate in the clockwise direction around the second axis Y.

Referring to FIGS. 7, 11A, and 11B, in order for the first contact unit 291 to move from the fourth position D to the first position A, the actuator 211, that is, one end portion of the piezoelectric devices 2010 and 2020 bends in the clockwise direction around the second axis Y, and the actuator 221, that is, one end portion of the piezoelectric devices 2030 and 2040 bends in the counterclockwise direction around the optical axis Z.

In order to bend one end portion of the piezoelectric devices 2010 and 2020 in the clockwise direction around the second axis Y, for example, when an electric field having a predetermined phase difference is applied to the piezoelectric devices 2010 and 2020, the piezoelectric device 2010 may contract along the first axis (X) direction and the piezoelectric device 2020 may expand along the first axis (X) direction, so that one end portion of the actuator 211 that is not supported by the pressing unit 240 may bend in the clockwise direction around the second axis Y.

When an electric field having a predetermined phase difference is applied to the piezoelectric devices 2030 and 2040, the piezoelectric device 2030 may expand along the second axis (Y) direction and the piezoelectric device 2040 may contract along the second axis (Y) direction, so that the other end portion of the actuator 221 that is not supported by the piezoelectric devices 2010 and 2020 may bend in the counterclockwise direction around the optical axis Z.

As described above, since the other end portion of the actuator 211 bends in the clockwise direction around the second axis Y and the other end portion of the actuator 221 bends in the counterclockwise direction around the optical axis Z, one end portion of the actuator 211 may move in the optical axis (Z) direction and one end portion of the actuator 221 may move in the first axis (X) direction. Therefore, the first contact unit 291 formed at one end portion of the actuator 221 may receive a contact force $F_{14}$ in the optical axis (Z) direction applied from the actuator 211 and may receive a driving force $F_{24}$ in the first axis (X) direction applied from the actuator 221. Accordingly, the first contact unit 291 may move from the fourth position D to the first position A.

Thus, the first contact unit 291 may move in an elliptical shape from the first position to the fourth position D according to the strain of the actuator 211 and the actuator 221, and the photographing apparatus 100 may rotate around the second axis Y since the driving force is transmitted to the photographing apparatus 100 in the process of moving the first contact unit 291.

Referring to FIGS. 6C and 6D, the actuator 212 according to an example embodiment may include piezoelectric devices 2050 and 2060 formed to extend in the second axis (Y) direction and stacked along the optical axis (Z) direction. One end portion of the piezoelectric devices 2050 and 2060 may be supported by the pressing unit 240, and electrodes 2130 and 2140 may be connected respectively to the piezoelectric devices 2050 and 2060 to apply an electric field having a predetermined phase difference. Accordingly, the actuator 212, that is, the other end portion of the piezoelectric devices 2050 and 2060 may bend in the clockwise or counterclockwise direction around the first axis X.

The actuator 222 may include piezoelectric devices 2070 and 2080 formed to extend in the first axis (X) direction and stacked along the second axis (Y) direction. One end portion of the piezoelectric devices 2070 and 2080 may be supported by one end portion of the piezoelectric devices 2050 and 2060, and electrodes 2230 and 2240 may be connected respectively to the piezoelectric devices 2070 and 2080 to apply an electric field having a predetermined phase difference. Accordingly, the actuator 222, that is, the other end portion of the piezoelectric devices 2070 and 2080 may bend in the clockwise or counterclockwise direction around the optical axis Z.

According to the strain of the actuator 212 and the actuator 222, a contact force $F_1$ and a driving force $F_2$ generated by the actuator 212 and the actuator 222 may be transmitted to the photographing apparatus 100 to rotate the photographing apparatus 100 on the first axis X. For example, referring to FIG. 12, in the process of moving in an elliptical shape from the first position A to the fourth position D, the second contact unit 292 formed at one end portion of the actuator 222 may contact the rear portion 142 of the housing unit 140 to apply the driving force in the second axis (Y) direction to the photographing apparatus 100. Accordingly, the photographing apparatus 100 may rotate around the first axis X. Since the contact force and the driving force caused by the strain of the actuator 212 and the actuator 222 and the corresponding position change of the second contact unit 292 are substantially the same as those described with reference to FIGS. 8A to 11B, repeated descriptions thereof will be omitted herein.

Figure 13:
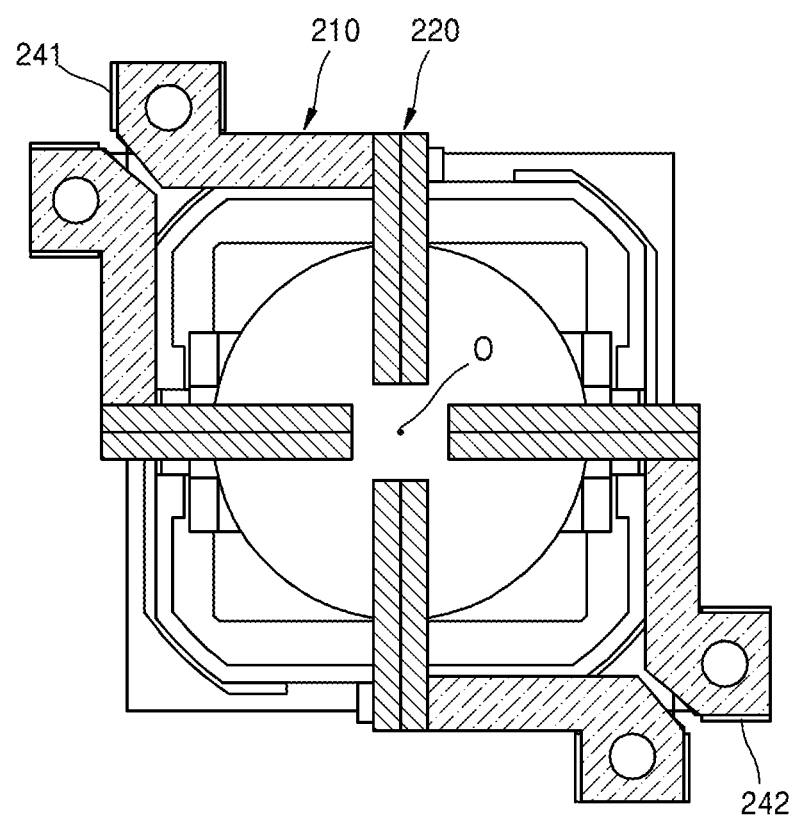
FIG. 13 is a front view of a photographing apparatus module according to an example embodiment.
Figure 14:
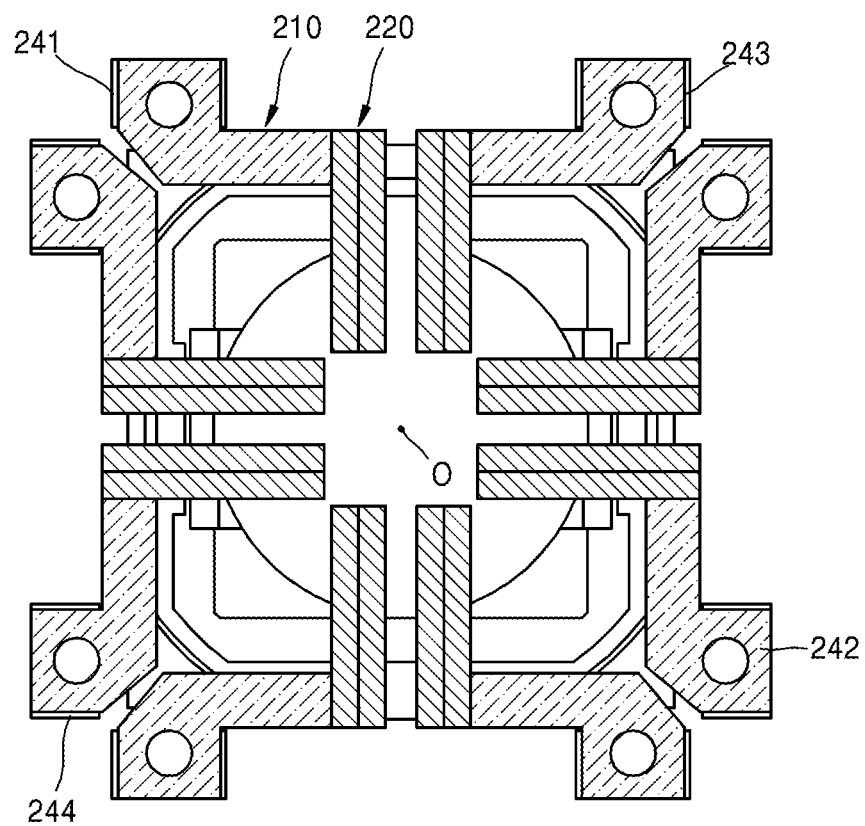
FIG. 14 is a front view of a photographing apparatus module according to an example embodiment.

FIG. 13 is a front view of a photographing apparatus module according to an example embodiment. FIG. 14 is a front view of a photographing apparatus module according to an example embodiment.

As described above, the photographing apparatus 100 may rotate around the first axis X and the second axis Y by using the pair of actuators 211 and 221 and the pair of actuators 212 and 222. The first and second actuator devices 210 and 220 may be formed in a pair or in a plurality of pairs.

For example, referring to FIG. 13, the first and second actuator devices 210 and 220 may be supported by a first pressing unit 241, and other first and second actuator devices 210 and 220 may be additionally disposed symmetrically with respect to a center O of the rear portion 142 of the housing unit 140. Additional first and second actuator device 210 and 220 may be supported by a second pressing unit 242.

Referring to FIG. 14, the first and second actuator devices 210 and 220 may be supported by the first pressing unit 241, and additional first and second actuator devices 210 and 220 may be disposed symmetrically with respect to the first axis X, the second axis Y, and the center O of the rear portion 142 of the housing unit 140. The additional first and second actuator devices 210 and 220 may be supported by second to fourth pressing units 242, 243, and 244. As described above, since the first and second actuator devices 210 and 220 are formed in a plurality of pairs, the first and second actuator devices 210 and 220 may increase the contact force and the driving force applied to the photographing apparatus 100.

Figure 15:
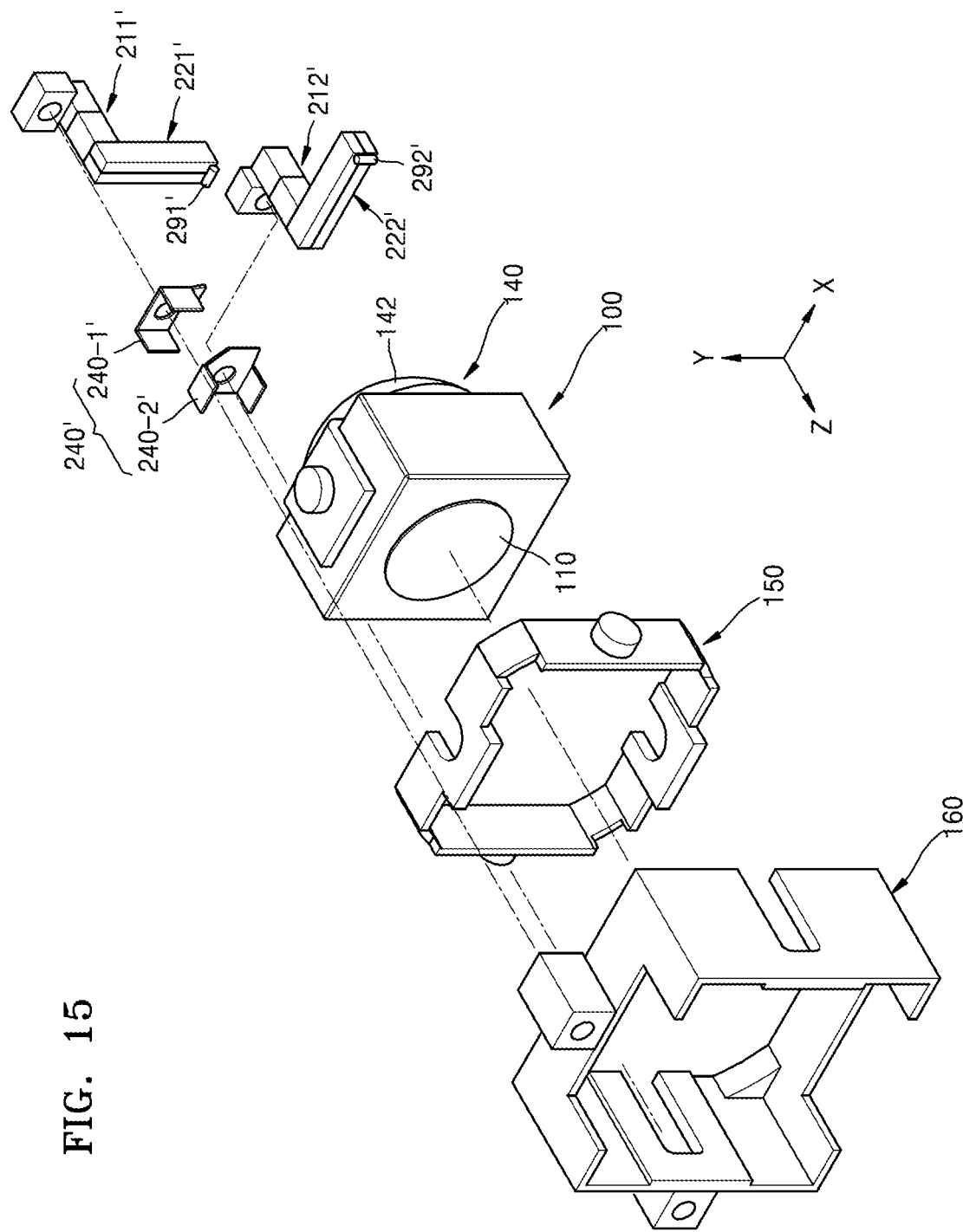
FIG. 15 is an exploded perspective view of a photographing apparatus module according to an example embodiment.
Figure 16A:
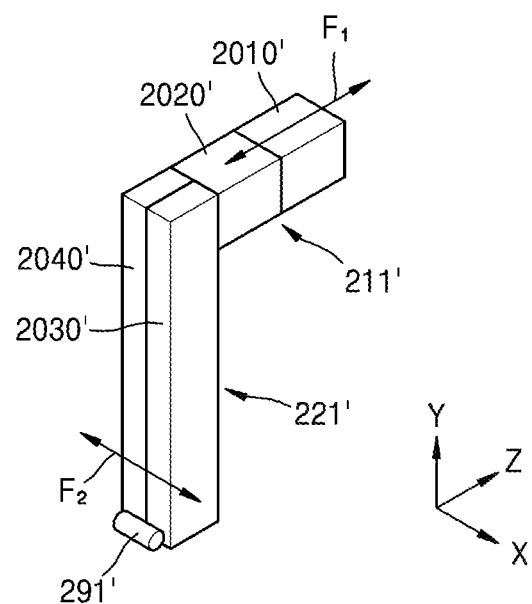
FIGS. 16A and 16B are partial perspective views of an actuator according to an example embodiment.
Figure 16B:
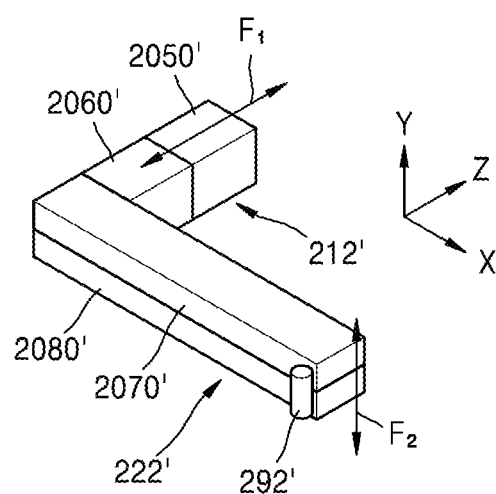

FIG. 15 is an exploded perspective view of a photographing apparatus module according to an example embodiment. FIGS. 16A and 16B are partial perspective views of an actuator according to an example embodiment.

Referring to FIGS. 15, 16A, and 16B, the actuator module 200 according to an example embodiment may include a first actuator device 210 applying a contact force $F_1$ in the optical axis (Z) direction to the photographing apparatus 100, a second actuator device 220 applying a driving force $F_2$ in the first axis (X) or second axis (Y) direction thereto, and pressing units 240'-1 and 240'-2 supporting the first and second actuator devices 210 and 220.

The first and second actuator devices 210 and 220 may include a plurality of piezoelectric devices 2000. According to an example embodiment, the piezoelectric device 2000 included in the first actuator device 210 may include a second type of piezoelectric device D33 in which the stack direction of piezoelectric materials included in the piezoelectric device 2000 and the strain direction of the piezoelectric device 2000 are parallel to each other, and the piezoelectric device 2000 included in the second actuator 220 may include a first type of piezoelectric device D31 in which the stack direction of piezoelectric materials included in the piezoelectric device 2000 and the strain direction of the piezoelectric device 2000 are perpendicular to each other.

For example, the first actuator device 210 may include an actuator 211' and an actuator 212' extending in the optical axis (Z) direction. The actuator 211' may include a piezoelectric device 2010' and a piezoelectric device 2020' extending in the optical axis (Z) direction. The piezoelectric device 2010' and the piezoelectric device 2020 may be supported by the pressing unit 240'-1, and electrodes (not shown) may be connected respectively to the piezoelectric device 2010' and the piezoelectric device 2020' to form an electric field by applying a voltage having a predetermined phase. Accordingly, the piezoelectric device 2010' and the piezoelectric device 2020' may expand or contract along the optical axis (Z) direction and thus the contact force $F_1$ in the optical axis (Z) direction may be transmitted to the first contact unit 291'.

The actuator 221' may include piezoelectric devices 2030' and 2040' formed to extend in the second axis (Y) direction and stacked along the first axis (X) direction. One end portion of the piezoelectric devices 2030' and 2040' may be supported by one end portion of the piezoelectric device 2010', and electrodes (not shown) may be connected respectively to the piezoelectric devices 2030' and 2040' to apply an electric field having a predetermined phase difference. The piezoelectric devices 2030' and 2040' may expand or contract along the second axis (Y) direction perpendicular to the first axis (X) direction. Accordingly, the actuator 221', that is, one end portion of the piezoelectric devices 2030' and 2040' may bend in the clockwise or counterclockwise direction around the optical axis Z. Thus, one end portion of the piezoelectric devices 2030' and 2040' may be moved in the first axis (X) direction to generate the driving force $F_2$ with respect to the photographing apparatus 100.

The actuator 212' may include a piezoelectric device 2050' and a piezoelectric device 2060' having piezoelectric materials stacked in the optical axis (Z) direction. The piezoelectric device 2050' and the piezoelectric device 2060' may be supported by the pressing unit 240'-2, and electrodes (not shown) may be connected respectively to the piezoelectric device 2050' and the piezoelectric device 2060' to form an electric field by applying a voltage having a predetermined phase. Accordingly, the piezoelectric device 2050' and the piezoelectric device 2060' may expand or contract along the optical axis (Z) direction and thus the contact force $F_1$ of the optical axis (Z) direction may be transmitted to the second contact unit 292'.

The actuator 222' may include piezoelectric devices 2070' and 2080' formed to extend in the first axis (X) direction and disposed to face each other along the second axis (Y) direction. One end portion of the piezoelectric devices 2070' and 2080' may be supported by one end portion of the piezoelectric device 2050', and electrodes (not shown) may be connected respectively to the piezoelectric devices 2070' and 2080' to apply an electric field having a predetermined phase difference. The piezoelectric devices 2070' and 2080' may expand or contract along the first axis (X) direction perpendicular to the second axis (Y) direction. Accordingly, the actuator 222', that is, one end portion of the piezoelectric devices 2070' and 2080' may bend in the clockwise or counterclockwise direction around the optical axis Z. Thus, one end portion of the piezoelectric devices 2070' and 2080' may be moved in the second axis (X) direction to generate the driving force $F_2$ with respect to the photographing apparatus 100.

According to the strain of the actuator 211', the actuator 221', the actuator 212', and the actuator 222', the contact force $F_1$ and the driving force $F_2$ generated by the actuator 211' and the actuator 221' may move the first contact unit 291' formed at one end portion of the actuator 221' in the elliptical direction as illustrated in FIG. 7, and the contact force $F_1$ and the driving force $F_2$ generated by the actuator 212' and the actuator 222' may move the second contact unit 292' formed at one end portion of the actuator 222' in the elliptical direction as illustrated in FIG. 12.

According to the movement of the first contact unit 291' and the second contact unit 292', the first and second contact units 291' and 292' and the rear portion 142 of the housing unit 140 may contact each other and thus the photographing apparatus 100 may rotate on the first axis X or the second axis Y. Since the contact force $F_1$ and the driving force $F_2$ caused by the strain of the actuator 211', the actuator 221', the actuator 212', and the actuator 222' and the corresponding position change of the first contact unit 291' and the second contact unit 292' are substantially the same as those described with reference to FIGS. 8A to 11B, repeated descriptions thereof will be omitted herein.

Figure 17:
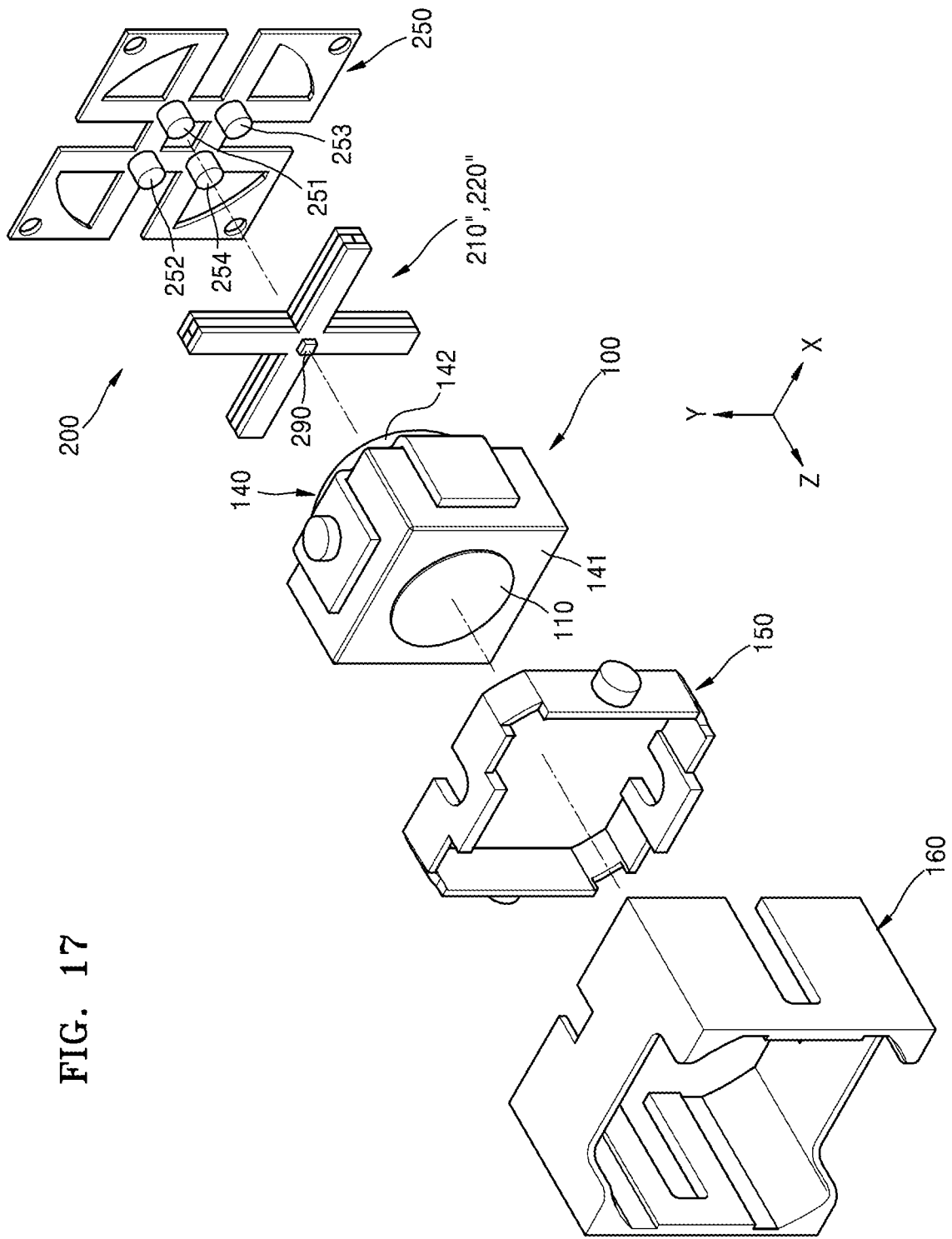
FIG. 17 is an exploded perspective view of a photographing apparatus module according to an example embodiment.
Figure 18:
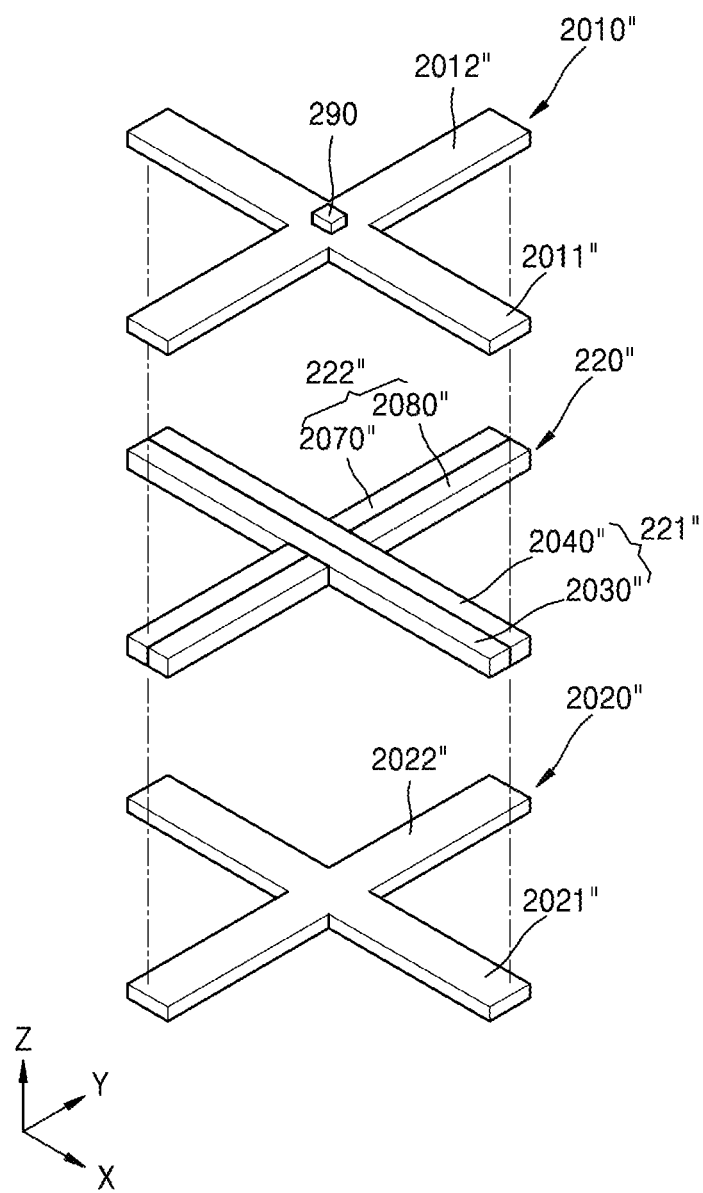
FIG. 18 is an exploded perspective view of an actuator module according to an example embodiment.
Figure 19A:
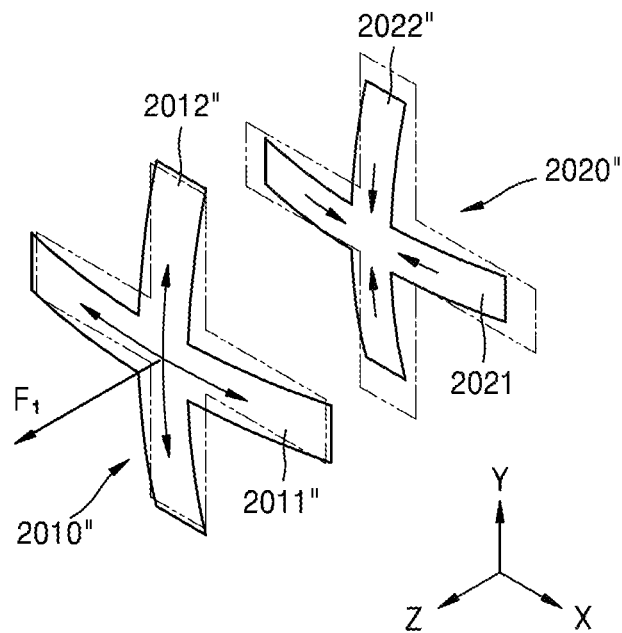
FIG. 19A is a schematic diagram illustrating a change of a first actuator device.
Figure 19B:
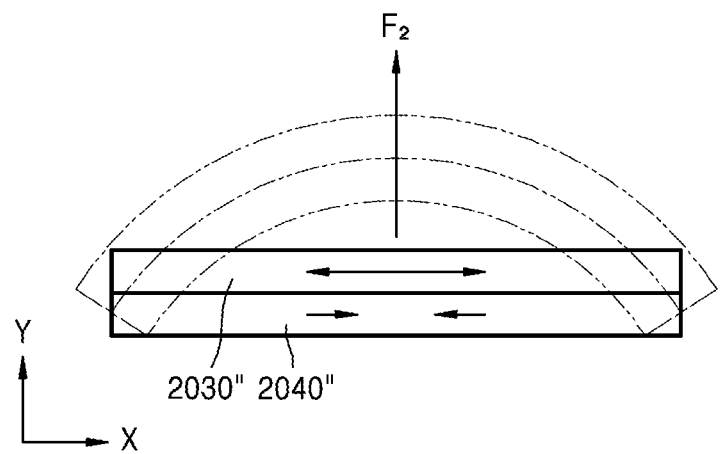
FIGS. 19B and 19C are schematic diagrams illustrating a change of a first actuator of a second actuator device.
Figure 19C:
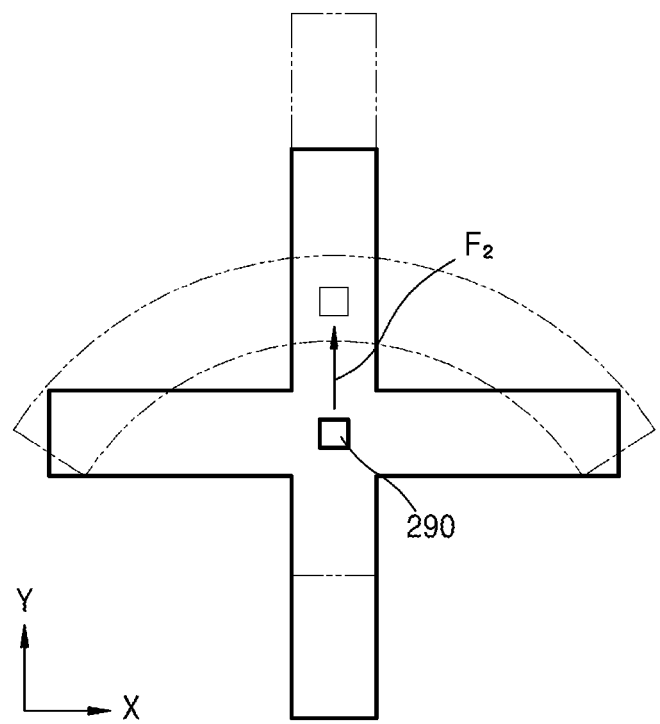
Figure 19D:
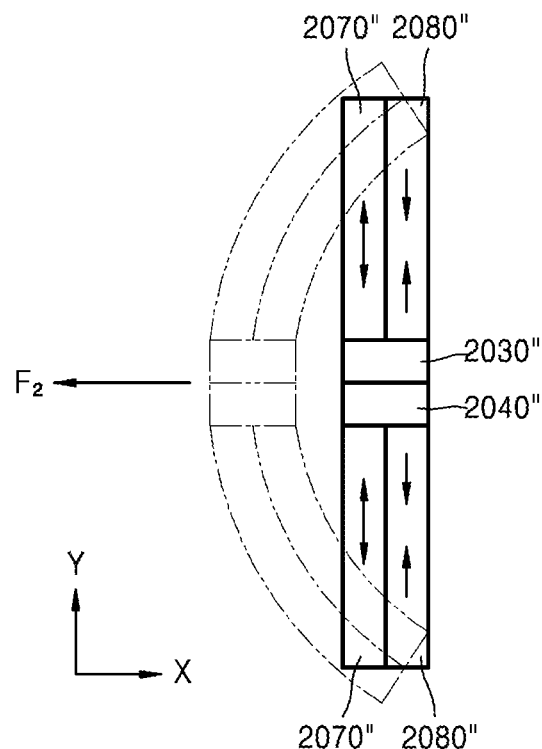
FIGS. 19D and 19E are schematic diagrams illustrating a change of a second actuator of the second actuator device.
Figure 19E:
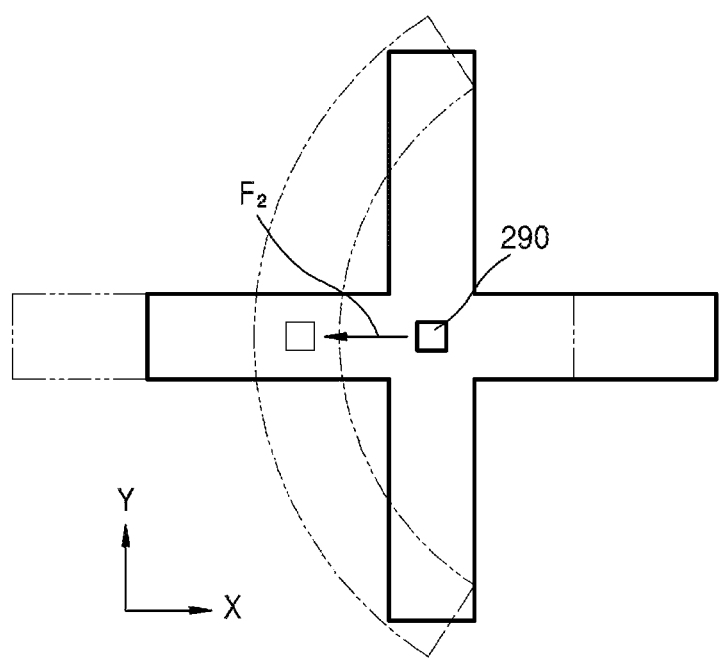

FIG. 17 is an exploded perspective view of a photographing apparatus module according to an example embodiment. FIG. 18 is an exploded perspective view of an actuator module according to an example embodiment. FIG. 19A is a schematic diagram illustrating a change of a first actuator device. FIGS. 19B and 19C are schematic diagrams illustrating a change of a first actuator of a second actuator device. FIGS. 19D and 19E are schematic diagrams illustrating a change of a second actuator of a second actuator device.

Referring to FIGS. 17, 18, and 19A to 19E, the actuator module 200 according to an example embodiment may include a first actuator device 210" applying a contact force $F_1$ in the optical axis (Z) direction to the photographing apparatus 100, a second actuator device 220" applying a driving force $F_2$ in the first axis (X) or second axis (Y) direction thereto, and a pressing plate 250 supporting the first and second actuator devices 210" and 220" and applying a pressure to the first and second actuator devices 210" and 220" in the optical axis (Z) direction. The pressing plate 250 may include an elastic member that may be strained by an external pressure, and may be disposed to face the photographing apparatus 100 to support the first and second actuator devices 210" and 220". Also, the pressing plate 250 according to an example embodiment may be formed to extend in the optical axis (Z) direction, and may include a plurality of support units 251 to 254 disposed in a center portion thereof at a predetermined interval therebetween.

The first and second actuator devices 210" and 220" may include a plurality of piezoelectric devices 2000. According to an example embodiment, the piezoelectric device 2000 included in the first actuator device 210" and the second actuator device 220" may include, but is not limited to, a first type of piezoelectric device D31 in which the stack direction of piezoelectric materials included in the piezoelectric device 2000 and the strain direction of the piezoelectric device 2000 are perpendicular to each other.

For example, the first actuator device 210" may include piezoelectric devices 2010" and 2020" that are formed in a cross shape extending in the first axis (X) and second axis (Y) directions and are disposed to face each other along the optical axis (Z) direction, and a contact unit or projection 290 formed to extend in the optical axis (Z) direction may be disposed at a center portion of the piezoelectric device 2010". The piezoelectric devices 2010" and 2020" may be disposed between a plurality of support units 251 to 254, so that the piezoelectric devices 2010" and 2020" may be supported by the pressing plate 250. As illustrated in FIG. 6B, the electrodes may be connected respectively to the piezoelectric devices 2010" and 2020" to apply an electric field having a predetermined phase difference. Accordingly, the first actuator device 210", that is, the first portions 2011" and 2021" of the piezoelectric devices 2010" and 2020" extending in the first axis (X) direction may bend around the second axis Y, and the second portions 2012" and 2022" of the piezoelectric devices 2010" and 2020" extending in the second axis (Y) direction may bend around the first axis X. Accordingly, the center portion of the first actuator device 210" may move in the optical axis (Z) direction, and thus the contact unit 290 formed at the center portion of the first actuator device 210" may receive the contact force $F_1$ in the optical axis direction.

For example, as illustrated in FIG. 19A, when an electric field having a predetermined phase difference is applied to the piezoelectric devices 2010" and 2020", the piezoelectric device 2010" expands along the first axis (X) and second axis (Y) directions and the piezoelectric device 2020" contracts along the first axis (X) and second axis (Y) directions. The first portions 2011" and 2021" of the piezoelectric devices 2010" and 2020" may bend around the second axis Y in the optical axis (Z) direction adjacent to the rear portion 142 of the housing unit 140, and the second portions 2012" and 2022" of the piezoelectric devices 2010" and 2020" may bend on the first axis X in the optical axis (Z) direction adjacent to the rear portion 142 of the housing unit 140. Accordingly, the center portion of the first actuator device 210" may move in the optical axis (Z) direction, and the contact force $F_1$ in the optical axis direction may be applied to the contact unit 290 disposed at the center portion of the first actuator device 210".

The actuator 221" may include piezoelectric devices 2030" and 2040" that are formed to extend in the first axis (X) direction, stacked along the second axis (Y) direction, and disposed between the piezoelectric devices 2010" and 2020". As illustrated in FIG. 6B, electrodes may be connected respectively to the piezoelectric devices 2030" and 2040" to apply an electric field having a predetermined phase difference. Accordingly, the actuator 221", that is, the piezoelectric devices 2030" and 2040" may bend on the optical axis Z, and the center portions of the piezoelectric devices 2030" and 2040" may move in the second axis (Y) direction. For example, as illustrated in FIGS. 19B and 19C, when an electric field having a predetermined phase difference is applied to the piezoelectric devices 2030" and 2040", the piezoelectric device 2030" expands along the first axis (X) direction and the piezoelectric device 2040" contracts along the first axis (X) direction. The piezoelectric devices 2030" and 2040" may bend on the optical axis Z and the center portions of the piezoelectric devices 2030" and 2040" may move along the second axis (Y) direction. Accordingly, the driving force $F_2$ in the second axis (Y) direction may be applied to the contact unit 290 disposed at the center portion of the first actuator device 210".

The actuator 222" may include piezoelectric devices 2070" and 2080" that are formed to extend in the second axis (Y) direction, stacked along the first axis (X) direction, and disposed between the piezoelectric devices 2010" and 2020". As illustrated in FIG. 6D, electrodes may be connected respectively to the piezoelectric devices 2070" and 2080" to apply an electric field having a predetermined phase difference. Accordingly, the actuator 222", that is, the piezoelectric devices 2070" and 2080" may bend around the optical axis Z, and the center portions of the piezoelectric devices 2070" and 2080" may move in the first axis (X) direction. For example, as illustrated in FIGS. 19D and 19E, when an electric field having a predetermined phase difference is applied to the piezoelectric devices 2070" and 2080", the piezoelectric device 2070" expands along the second axis (Y) direction and the piezoelectric device 2080" contracts along the second axis (Y) direction. The piezoelectric devices 2070" and 2080" may bend around the optical axis Z and the center portions of the piezoelectric devices 2070" and 2080" and 2080" may move along the first axis (X) direction. Accordingly, the driving force $F_2$ in the first axis (X) direction may be applied to the contact unit 290 disposed at the center portion of the first actuator device 210".

According to the strain of the first actuator device 210", the actuator 221", and the actuator 222", the contact force $F_1$ and the driving force $F_2$ generated by the first actuator device 210" and the actuator 221" may move the contact unit 290 formed at the center portion of the first actuator device 210" in the elliptical direction as illustrated in FIG. 7, and the contact force $F_1$ and the driving force $F_2$ generated by the first actuator device 210" and the actuator 222" may move the contact unit 290 formed at the center portion of the first actuator device 210" in the elliptical direction as illustrated in FIG. 12.

According to the movement of the contact unit 290 in the elliptical direction, the contact unit 290 and the rear portion 142 of the housing unit 140 may contact each other and thus the photographing apparatus 100 may rotate around the first axis X or the second axis Y. Since the contact force and the driving force caused by the strain of the first actuator device 210", the actuator 221", the actuator 212", and the actuator 222" and the corresponding position change of the first contact unit 291 and the second contact unit 292 are substantially the same as those described with reference to FIGS. 8A to 11B, repeated descriptions thereof will be omitted herein.

Figure 20A:
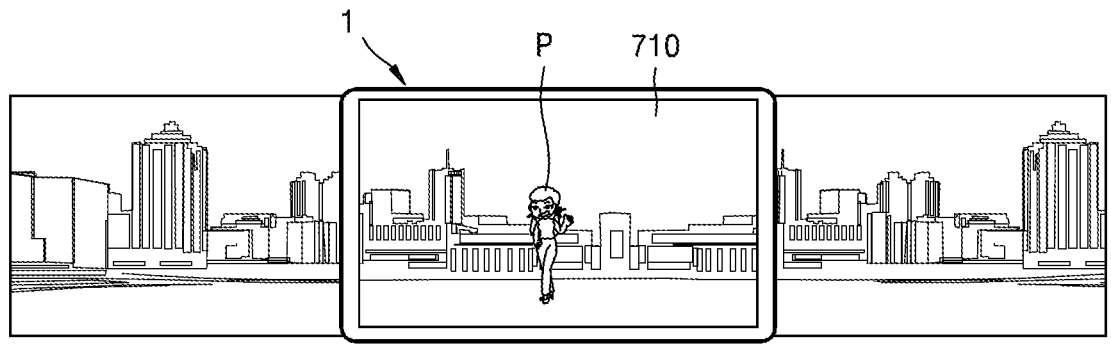
FIGS. 20A, 20B and 20C are conceptual diagrams illustrating an example of capturing an image by a user terminal, according to an example embodiment.
Figure 20A:
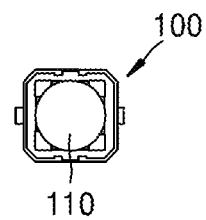
Figure 20B:
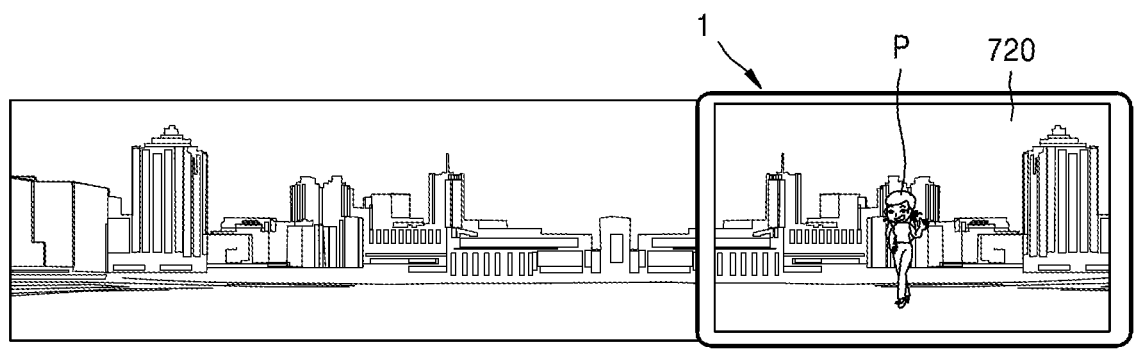
Figure 20B:
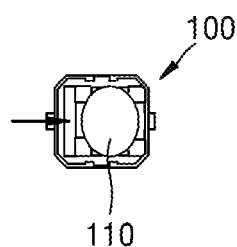
Figure 20C:
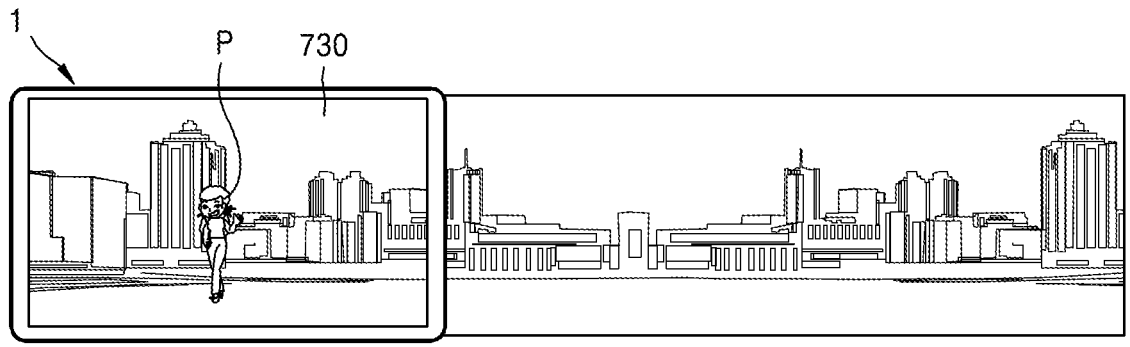
Figure 20C:
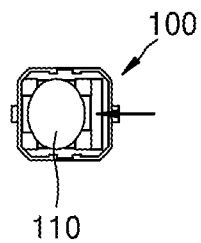
Figure 21:
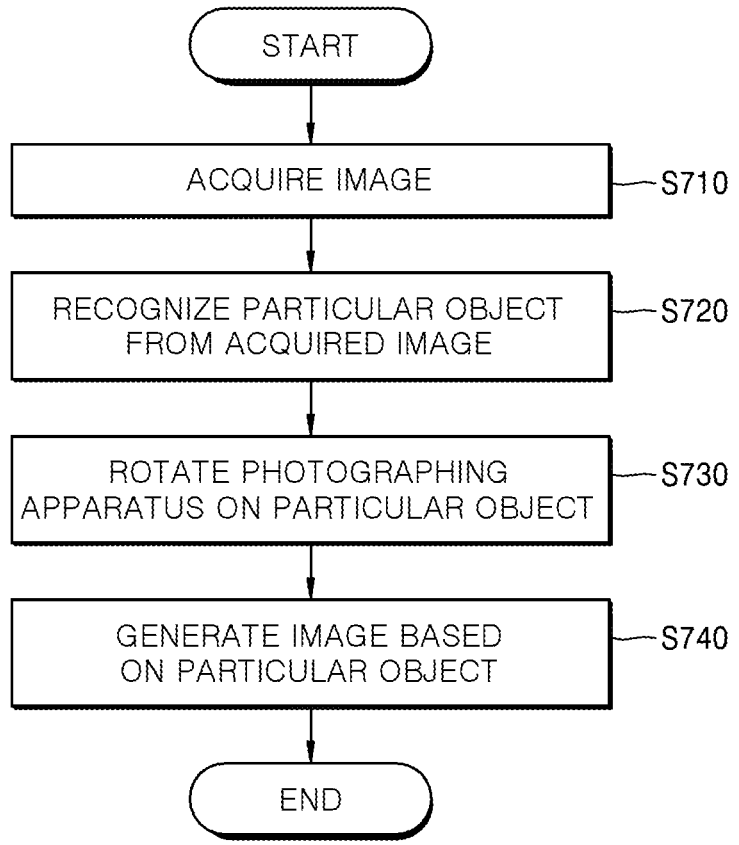
FIG. 21 is a flowchart illustrating a method of capturing an image by a user terminal, according to an example embodiment.

FIGS. 20A to 20C are conceptual diagrams illustrating an example of capturing an image by a user terminal according to an example embodiment. FIG. 21 is a flowchart illustrating a method of capturing an image by a user terminal according to an example embodiment.

Referring to FIGS. 1 and 21, in operation S710, the photographing apparatus 100 may acquire an image by using the image sensor 130. The photographing apparatus 100 may acquire a region, which includes a particular object P (e.g., a person) in the entire image illustrated in FIG. 20A, as a first image 710.

Thereafter, in operation S720, the control unit 12 may recognize the particular object P from the acquired image. For example, when the photographing apparatus 100 acquires a region, which includes a particular object P (e.g., a person) in the entire image illustrated in FIG. 20A, as a first image 710, the control unit 12 may recognize the person included in the first image 710 by using a recognition process.

In operation S730, when the particular object P is recognized in the image, the control unit 12 may rotate the photographing apparatus 100 on the region of the image including the recognized particular object P. The control unit 12 may control the rotation degree and the rotation direction of the photographing apparatus 100 by applying a driving signal to the actuator module 200. For example, when the particular object P is a person and the control unit 12 recognizes the person included in the image, the actuator module 200 may rotate the photographing apparatus 100 according to the movement direction and speed of the person as illustrated in FIGS. 20B and 20C. Accordingly, the photographing apparatus 100 may generate a second image 720 and a third image 730 including the particular object P (e.g., the person) as a reference point.

In operation S740, during the rotation of the photographing apparatus 100, the photographing apparatus 100 may generate an image based on the particular object P. According to an example embodiment, in operation S740, the photographing apparatus 100 may generate a still image or a moving image after notifying the user of the arrival of a suitable photographing time point by outputting a notification sound or icon. According to another example embodiment, the photographing apparatus 100 may generate a still image or a moving image immediately when the position of the photographing apparatus 100 is determined by using the particular object P as the reference point.

Figure 22A:
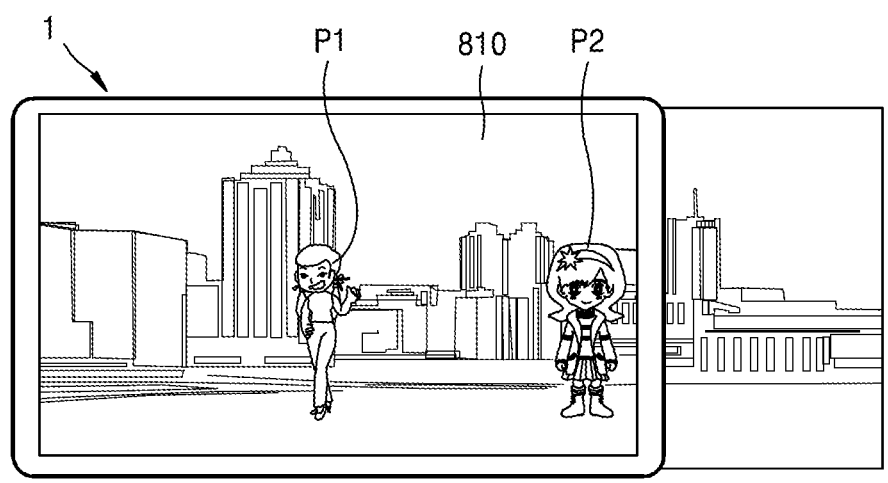
FIGS. 22A, 22B, 22C and 22D are conceptual diagrams illustrating an example of capturing an image by a user terminal, according to an example embodiment.
Figure 22A:
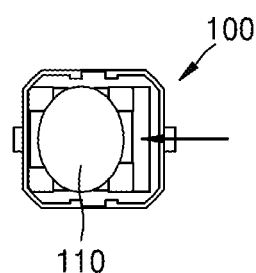
Figure 22B:
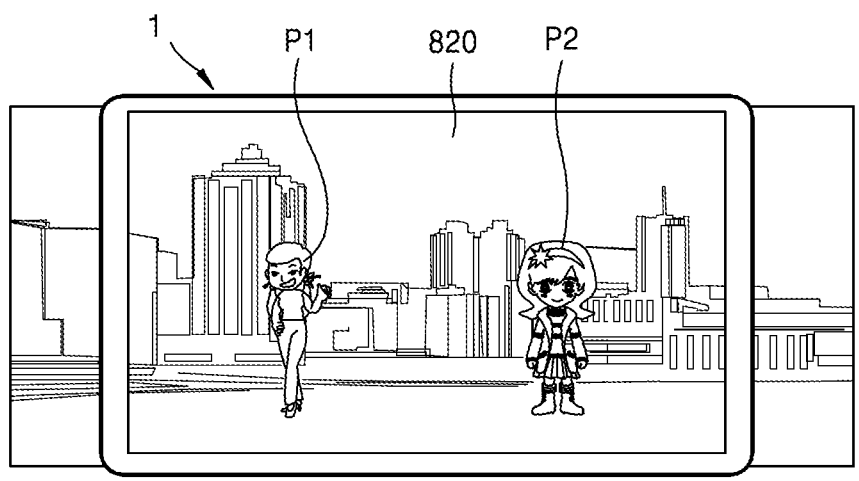
Figure 22B:
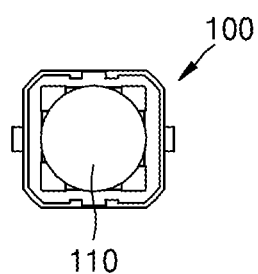
Figure 22C:
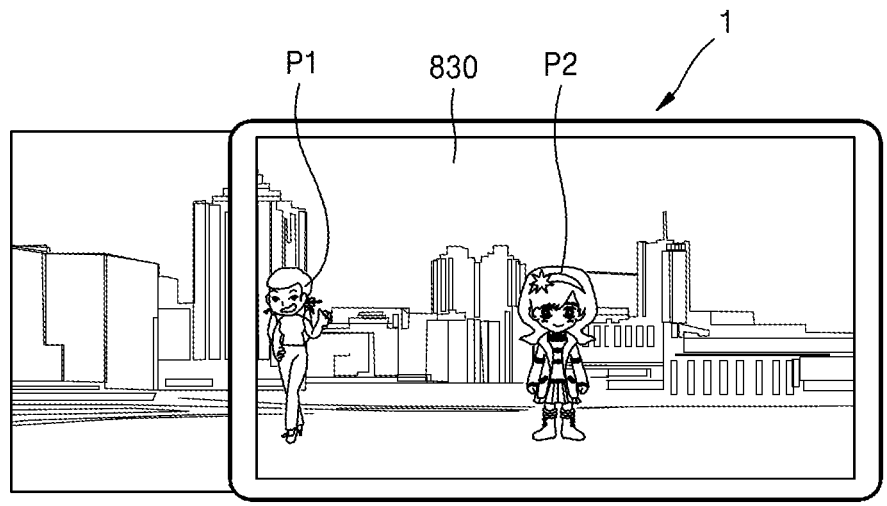
Figure 22C:
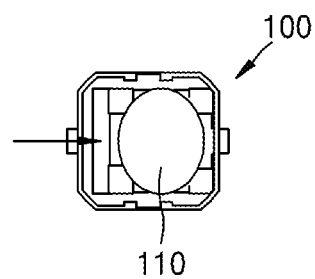
Figure 22D:
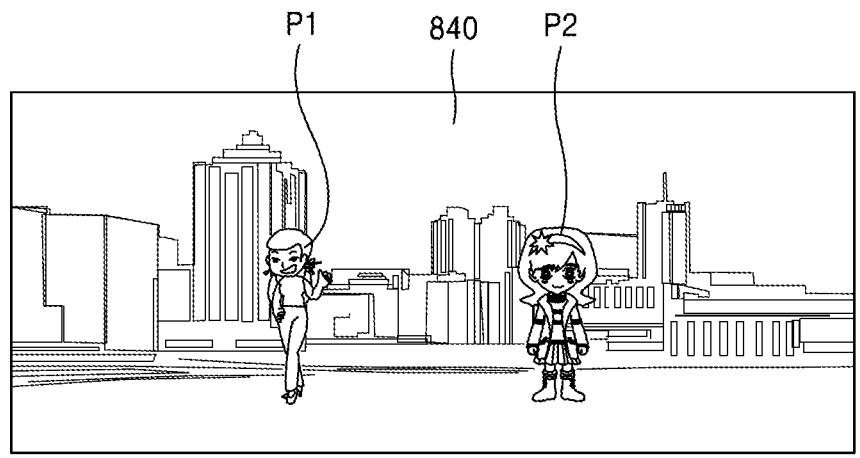
Figure 23:
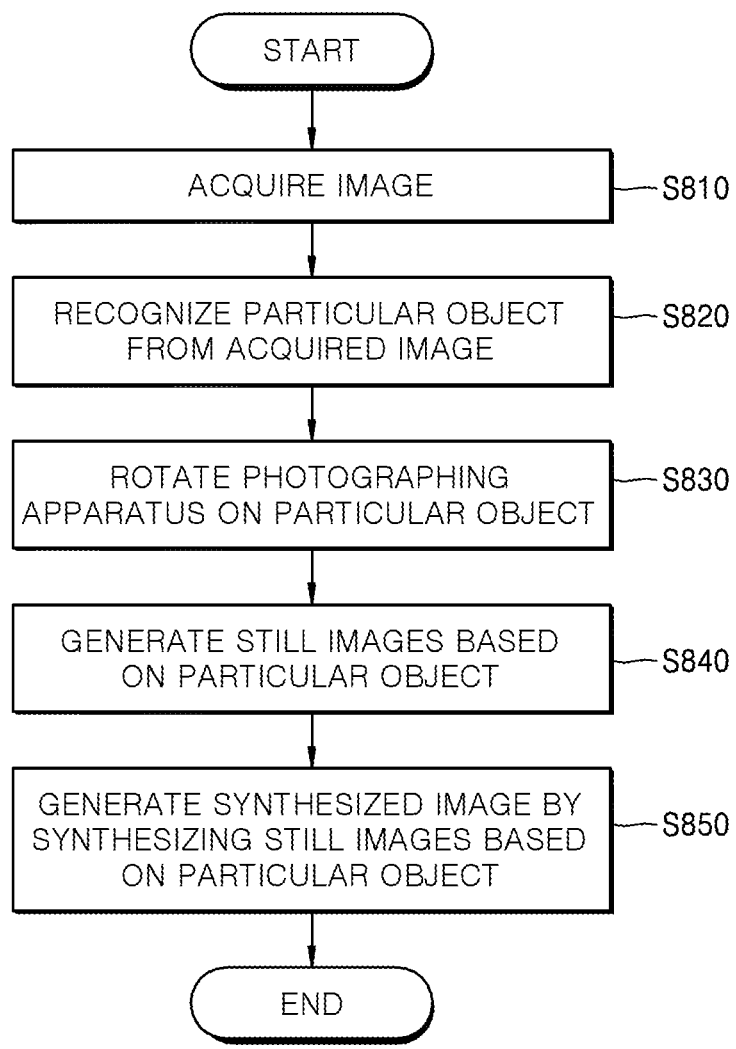
FIG. 23 is a flowchart illustrating a method of capturing an image by a user terminal, according to an example embodiment.

FIGS. 22A to 22D are conceptual diagrams illustrating an example of capturing an image by a user terminal according to an example embodiment. FIG. 23 is a flowchart illustrating a method of capturing an image by a user terminal according to an example embodiment.

Referring to FIGS. 1 and 23, in operation S810, the photographing apparatus 100 may acquire an image by using the image sensor 130. Thereafter, in operation S820, the control unit 12 may recognize a particular object P from the acquired image. Operations S810 and S820 may be performed in substantially the same manner as operations S710 and S720 of FIG. 21.

In operation S830, when the particular object P is recognized in the image, the control unit 12 may rotate the photographing apparatus 100 on the region of the image including the recognized particular object P. The control unit 12 may control the rotation degree and the rotation direction of the photographing apparatus 100 by applying a driving signal to the actuator module 200. For example, when the particular object P is a person and the control unit 12 recognizes the person included in the image, the actuator module 200 may rotate the photographing apparatus 100 on the recognized person.

One or more particular objects P may be determined. For example, when the particular objects P are a first person P1 and a second person P2 included in the acquired image, the control unit 12 may recognize the first person P1 and the second person P2 included in the acquired image. The actuator module 200 may rotate the photographing apparatus 100 based on the first person P1 and the second person P2 in the unprocessed image.

In operation S840, the photographing apparatus 100 may generate a plurality of still images based on a plurality of particular objects P. According to an example embodiment, when a panorama photographing mode or a Wide Selfie photographing mode is input through the input/output module 16, the photographing apparatus 100 may generate a plurality of still images 810, 820, and 830 illustrated in FIGS. 22A to 22C, at predetermined intervals therebetween, during the rotation of the photographing apparatus 100 in operation S830.

In operation S850, the control unit 12 may generate a synthesized image 840 by synthesizing the still images 810, 820, and 830 based on the particular object P. According to an example embodiment, the still images 810, 820, and 830 acquired at the predetermined intervals by the photographing apparatus 100 may include the particular object P, for example, both the first person P1 and the second person P2. The control unit 12 may generate a synthesized image 840 having a larger display region as illustrated in FIG. 22D, by synthesizing the still images 810, 820, and 830 based on the first person P1 and the second person P2 included in the still images 810, 820, and 830.

Figure 24A:
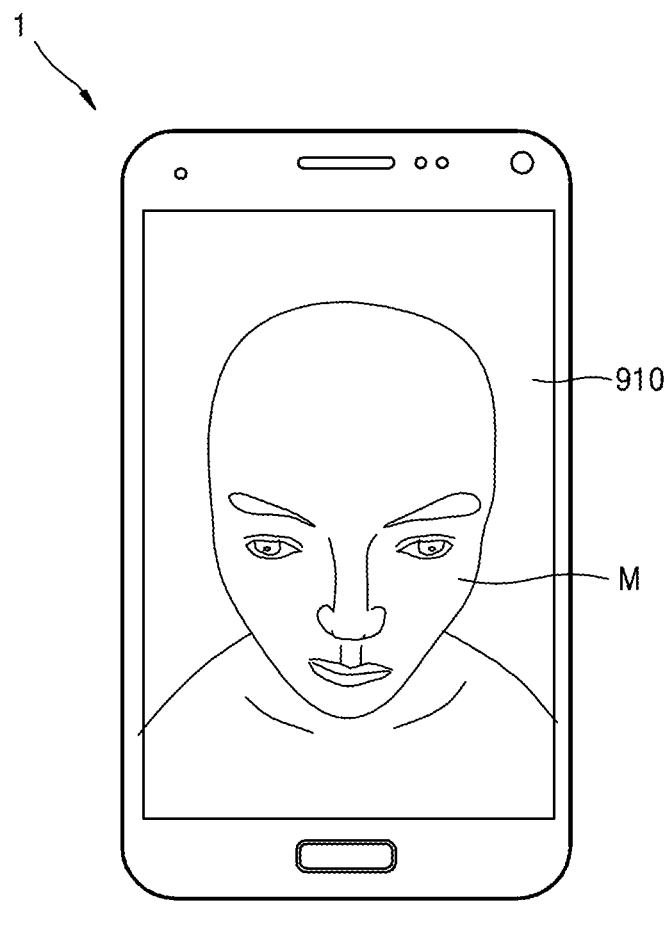
FIGS. 24A and 24B are conceptual diagrams illustrating an example of capturing an image by a user terminal, according to an example embodiment.
Figure 24A:
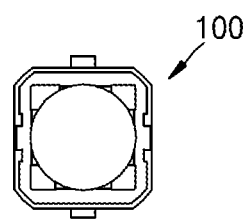
Figure 24B:
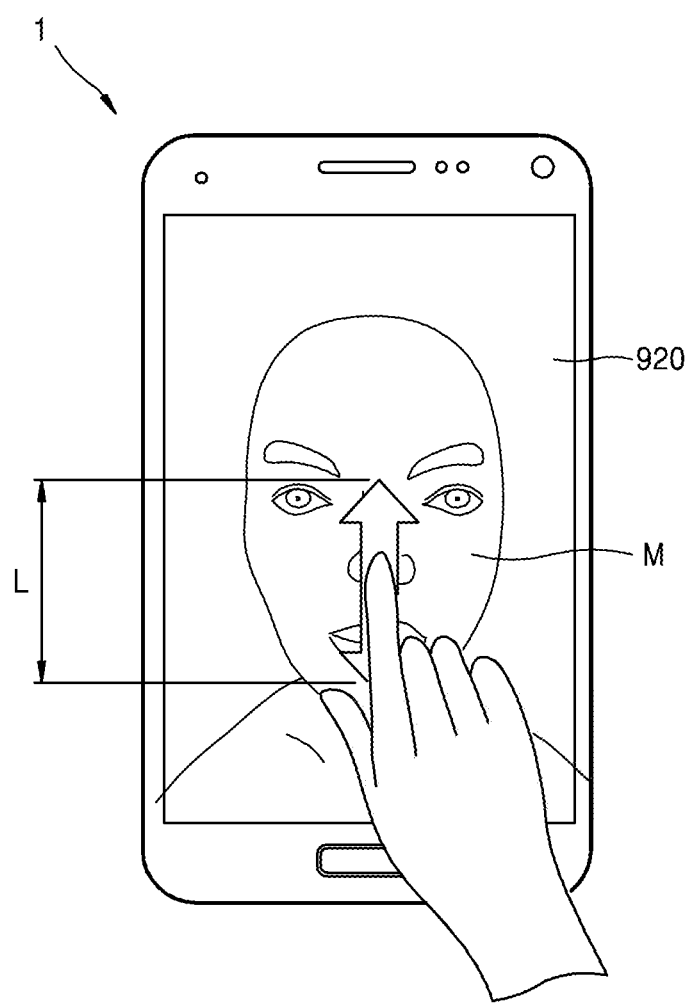
Figure 24B:
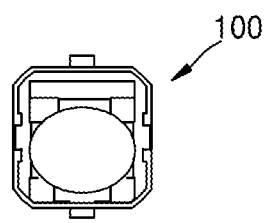
Figure 25:
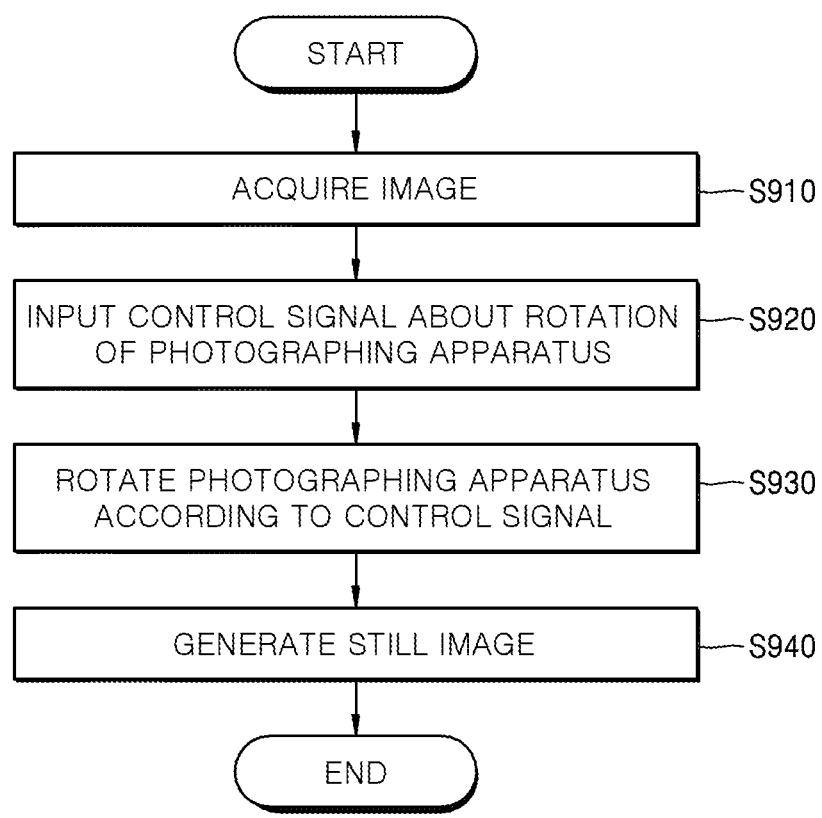
FIG. 25 is a flowchart illustrating a method of capturing an image by a user terminal, according to an example embodiment.

FIGS. 24A and 24B are conceptual diagrams illustrating an example of capturing an image by a user terminal according to an example embodiment. FIG. 25 is a flowchart illustrating a method of capturing an image by a user terminal according to an example embodiment.

Referring to FIGS. 1 and 25, in operation S910, the photographing apparatus 100 may acquire an image by using the image sensor 130. According to an example embodiment, as illustrated in FIG. 24A, the photographing apparatus 100 may display a preview image 910 in order for a user M to capture his image. When the user M sees the preview image 910, since the eyesight of the user M photographed by the photographing apparatus 100 may not face the lens unit 110 of the camera, an unnatural image of the user M may be captured.

In operation S920, a control signal for controlling the rotation of the photographing apparatus 100 may be input through the input/output module 16. According to an example embodiment, the user may determine the rotation direction and the rotation degree of the photographing apparatus 100 based on a preview image 920, and a control signal for controlling the rotation direction and the rotation degree of the photographing apparatus 100 may be input through the input/output module 16.

As an example, the input/output module 16 may include a short-range wireless communication unit, and the user may use the short-range wireless communication unit to transmit the control signal for controlling the rotation direction and the rotation degree of the photographing apparatus 100 to the photographing apparatus 100. For example, the short-range wireless communication unit 162 may transmit the control signal to the photographing apparatus 100 by using any one of Bluetooth, BLE, NFC, RFID, WiFi, Beacon, ZigBee, and UWB communication.

As another example, the input/output module 16 may include the touch panel 163, and the movement distance and the direction of a touch input by the user may be used as an input signal about the rotation degree and the rotation direction of the photographing apparatus 100. The movement distance of the touch input may be converted into the rotation degree of the photographing apparatus 100 according to Equation 1 below, and the rotation degree of the photographing apparatus 100 may be controlled more accurately according to the set range of a conversion constant α.

$$\text{Rotation Angle} = \text{Touch Input Movement Distance } (L) \times \alpha \quad \text{Equation 1}$$

In operation S930, when a control signal about the rotation of the photographing apparatus 100 is input through the input/output module 16, the actuator module 200 may rotate the photographing apparatus 100 according to the control signal. The control unit 12 may control the rotation degree and the rotation direction of the photographing apparatus 100 by applying a driving signal to the actuator module 200.

In operation S940, when the position of the photographing apparatus 100 is determined according to the control signal input through the input/output module 16, the photographing apparatus 100 may generate a still image. According to an example embodiment, in operation S940, the photographing apparatus 100 may generate a still image after notifying the user of the arrival of a suitable photographing time point by outputting a notification sound or icon. According to another example embodiment, the photographing apparatus 100 may generate a still image immediately when the position of the photographing apparatus 100 is determined.

The foregoing is illustrative of the example embodiments and is not to be construed as limiting thereof. Although the example embodiments have been described above, those of ordinary skill in the art will readily understand that various modifications are possible in the example embodiments without materially departing from the concepts and features of the example embodiments. Therefore, it is to be understood that the example embodiments described above should be considered in a descriptive sense only and not for purposes of limitation. For example, elements described as being combined may also be implemented in a distributed manner, and elements described as being distributed may also be implemented in a combined manner.

Therefore, the scope of the concepts disclosed herein is defined not by the detailed description of the example embodiments but by the appended claims, and all modifications or differences within the scope should be construed as being included in the disclosed concepts.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A user terminal comprising:
a photographing apparatus configured to rotate on a first axis and a second axis perpendicular to the first axis; and
an actuator module configured to rotate the photographing apparatus around the first axis or the second axis,
wherein the actuator module comprises:
one or more first actuator devices configured to apply a contact force along an optical axis direction of the photographing apparatus that is perpendicular to the first axis and the second axis; and
one or more second actuator devices configured to apply a driving force to the photographing apparatus along the first axis or the second axis, and
wherein a first actuator of the one or more first actuator devices includes a first end portion connected to a first end portion of a second actuator of the one or more second actuator devices so that the second actuator is moved by bending of the first actuator.

2. The user terminal of claim 1, further comprising control circuitry configured to generate a control signal for rotating the photographing apparatus,
wherein the photographing apparatus comprises an image sensor configured to acquire an image signal.

3. The user terminal of claim 2, wherein the control circuitry is configured to generate a first image based on the image signal, recognize a particular object in the first image, and rotate the photographing apparatus based on the particular object.

4. The user terminal of claim 3, wherein the control circuitry is configured to rotate the photographing apparatus based on the particular object when the particular object moves.

5. The user terminal of claim 3, wherein the control circuitry is configured to acquire still images during the rotation of the photographing apparatus and generate a synthesized image by synthesizing the still images based on the particular object.

6. The user terminal of claim 2, further comprising an input/output device configured to receive an input signal input from an outside thereof,
wherein the control circuitry is configured to rotate the photographing apparatus according to the input signal.

7. The user terminal of claim 6, wherein the control circuitry is configured to generate a preview image based on the image signal and rotate the photographing apparatus according to a control signal input through the input/output device by using the preview image.

8. The user terminal of claim 7, wherein
the input/output device comprises a touch panel configured to receive a touch input, and
a rotation direction and a rotation degree of the photographing apparatus are determined according to a direction and a movement distance of the touch input.

9. The user terminal of claim 8, wherein the rotation degree of the photographing apparatus is proportional to the movement distance of the touch input.

10. The user terminal of claim 7, wherein the input/output device comprises short-range wireless communication circuitry.

11. A method of operating the user terminal of claim 1, the method comprising:
generating a first image by using an image signal acquired through an image sensor;
recognizing a particular object by performing image recognition on the first image; and
rotating the photographing apparatus based on the particular object.

12. The method of claim 11, further comprising generating a synthesized image by synthesizing still images, which are acquired from the rotating photographing apparatus, based on the particular object.

13. A method of operating the user terminal of claim 1, the method comprising:

generating a preview image by using an image signal acquired through an image sensor;

receiving a control signal generated by using the preview image; and rotating the photographing apparatus according to the control signal.

14. The method of claim 13, wherein the receiving of the control signal comprises receiving a touch input to a touch panel, and in the rotating of the photographing apparatus, a rotation direction and a rotation degree of the photographing apparatus are determined according to a direction and a movement distance of the touch input.

15. The method of claim 14, wherein the rotation degree of the photographing apparatus is proportional to the movement distance of the touch input.

* * * * *